(12) United States Patent
Schreiber

(10) Patent No.: US 12,186,150 B2
(45) Date of Patent: Jan. 7, 2025

(54) DEVICE FOR SHAPING AND SIMULTANEOUS FLUSHING AND SUCTION OF A TOOTH ROOT CANAL

(71) Applicant: ReDentNova GmbH & CO. KG, Berlin (DE)

(72) Inventor: Zeev Schreiber, Berlin (DE)

(73) Assignee: ReDentNova GmbH & CO. KG, Berlin (DE)

( * ) Notice: Subject to any disclaimer, the term of this patent is extended or adjusted under 35 U.S.C. 154(b) by 219 days.

(21) Appl. No.: 17/793,141

(22) PCT Filed: Jan. 16, 2021

(86) PCT No.: PCT/EP2021/050881
§ 371 (c)(1),
(2) Date: Jul. 15, 2022

(87) PCT Pub. No.: WO2021/144465
PCT Pub. Date: Jul. 22, 2021

(65) Prior Publication Data
US 2023/0050847 A1     Feb. 16, 2023

(30) Foreign Application Priority Data
Jan. 17, 2020   (EP) .................................... 20152565

(51) Int. Cl.
*A61C 5/40*     (2017.01)
*A61C 1/05*     (2006.01)
*A61C 17/02*    (2006.01)

(52) U.S. Cl.
CPC ............... *A61C 5/40* (2017.02); *A61C 1/055* (2013.01); *A61C 17/0208* (2013.01); *A61C 2201/007* (2013.01)

(58) Field of Classification Search
CPC ............ A61C 5/40–55; A61C 17/0208; A61C 17/0217; A61C 17/024; A61C 17/028;
(Continued)

(56) References Cited

U.S. PATENT DOCUMENTS

| 4,804,364 A | 2/1989 | Dieras et al. | |
| 2007/0054238 A1* | 3/2007 | Hof | A61C 5/42 433/102 |

(Continued)

FOREIGN PATENT DOCUMENTS

| EP | 0209468 | 1/1987 |
| WO | WO-2008/062411 | 5/2008 |

OTHER PUBLICATIONS

International Application No. PCT/EP2021/050881, International Search Report and Written Opinion, mailed Mar. 15, 2021.

*Primary Examiner* — Heidi M Eide
*Assistant Examiner* — Shannel Nicole Belk
(74) *Attorney, Agent, or Firm* — MARSHALL, GERSTEIN & BORUN LLP

(57) ABSTRACT

The present invention relates to a dental device for shaping and simultaneous flushing and suction of a tooth root canal, a head of a dental device for shaping and simultaneous flushing and suction a tooth root canal by shaping the tooth root canal and a hollow endodontic file for shaping and simultaneous flushing and suction a tooth root canal by shaping the tooth root canal.

16 Claims, 9 Drawing Sheets

(58) Field of Classification Search
CPC ....... A61C 17/06; A61C 17/065; A61C 17/08; A61C 17/096; A61C 17/0211
See application file for complete search history.

(56) References Cited

U.S. PATENT DOCUMENTS

| | | | | |
|---|---|---|---|---|
| 2008/0160480 A1* | 7/2008 | Ruddle | ............... | A61C 5/40 |
| | | | | 433/81 |
| 2011/0033821 A1* | 2/2011 | Rzhanov | ............... | A61C 5/42 |
| | | | | 433/102 |
| 2012/0219927 A1* | 8/2012 | Maxwell | ............... | A61C 5/42 |
| | | | | 433/102 |
| 2013/0260334 A1* | 10/2013 | Pernot | ............... | A61C 5/50 |
| | | | | 433/81 |
| 2014/0302454 A1* | 10/2014 | Maxwell | ............ | A61C 17/0208 |
| | | | | 433/91 |
| 2018/0153644 A1* | 6/2018 | Bosisio | ............... | A61C 5/40 |

* cited by examiner

DEVICE FOR SHAPING AND SIMULTANEOUS FLUSHING AND SUCTION OF A TOOTH ROOT CANAL

CROSS-REFERENCE TO RELATED APPLICATIONS

This is a U.S. National Phase of International Application No. PCT/EP2021/050881, filed Jan. 16, 2021, which claims priority to European Application No. 20152565.6, filed Jan. 17, 2020, the contents of which are incorporated herein by reference.

The present invention relates to a dental device for shaping and simultaneous flushing and suction of a tooth root canal, a head of a dental device for shaping and simultaneous flushing and suction a tooth root canal by shaping the tooth root canal and a hollow endodontic file for shaping and simultaneous flushing and suction a tooth root canal by shaping the tooth root canal.

BACKGROUND OF THE INVENTION

The root canal of a tooth has to be shaped during root canal treatment. Thereby tissue remnants and dentin mud are formed as debris which has to be removed since otherwise the tooth root canal becomes clogged.

WO 2008/062411 A1 discloses a dental irrigator for delivering irrigant solution such as a sodium hypochlorite solution being harmful from an irrigation solution reservoir to the site of a dental procedure. The irrigator comprises a hollow dental tool, a housing that provides a watertight volume surrounding the inlets while allowing the tool to be freely moved with respect to the housing, and a supply hose, which conducts the irrigant solution at relatively low pressure from the reservoir to the housing. The dental irrigation device can be used with a suitable endodontic file to allow continuous flushing of the root canal while the file is inserted into the canal and engaged in cleaning and shaping. However, the debris formed during the root canal treatment is still not removed, i.e. the debris is still present in the root canal. In order to remove the debris, a second device for aspiration of the irrigation solution must be used. It is apparent that a second device has to be inserted into the mouth, where the space is limited and that this is impractical. Since two persons are required for the treatment, the person responsible for the aspiration device could disturb the dentist and thus cause an accident. Moreover, the use of two devices necessitates drilling a larger hole in order to ensure that both devices can be inserted.

Furthermore, if an irrigation solution such as sodium hypochlorite is used, it is necessary to protect the subject. For this, a rubber dam is applied. However, the treatment time is remarkably elongated, and thus the time of suffering for the subjects is expanded by said procedure.

The US patent application publication US 2014/0302454 A1 is directed to a device for performing dental procedures, and specifically to an ultrasonic tip, useful for delivering and agitating irrigants as well as aspirating said irrigants in root canal therapy, i.e. endodontics. Generally, this application discloses an ultrasonic tip assembly comprising a housing for attaching to the dental tool. The housing includes a conduit for attachment to the dental tool and bore for at least partially encasing at least one aspiration needle and at least one irrigation needle. The at least one aspiration needle and/or the at least one irrigation needle having a passageway extending at least partially through the needle, a substantial length of the needle, or at least from one end to the other end of the needle. The aspiration passageway provides a single continuous path to aspirate the irrigant and/or debris from the coronal opening and/or root canal cavity of the tooth. The passageway of the at least one irrigation needle provides a continuous flow path for delivering fluid or irrigant from a proximal end of the irrigation needle to the distal end of the irrigation needle and into a root canal/coronal opening of a tooth. The aspiration needle and irrigation needle are connected together at a point or along a portion therebetween to achieve a first predetermined resonant frequency of e.g. the aspiration needle.

It is the objective of the present invention to provide a device for shaping and flushing of a tooth root canal, and a hollow endodontic file for reducing the treatment time, reducing the risk of accident with a harmful irrigation solution in particular sodium hypochlorite, increasing the practicability, reducing personnel effort during treatment, effectively and completely removing the debris, and/or reducing the required space in the tooth for the root canal treatment, i.e. reducing the loss of dental substance.

The objective of the present invention is solved by the teaching of the independent claims. Further advantageous features, aspects and details of the invention are evident from the dependent claims, the description, the figures, and the examples of the present application.

BRIEF DESCRIPTION OF THE INVENTION

The objective is solved by a dental device (600) for shaping and flushing a tooth root canal by shaping the tooth root canal with a hollow elongated mesh-like structure (100) while flushing the tooth root canal with an irrigation solution comprising a head (400), wherein the head (400) comprises a hollow endodontic instrument (10) for insertion into the tooth root canal, and a motorized power handle (500).

DESCRIPTION OF THE INVENTION

An embodiment according to the invention is directed to a dental device (600) for shaping and simultaneous flushing and suction a tooth root canal by shaping the tooth root canal with a hollow elongated mesh-like structure (100) while flushing the tooth root canal with an irrigation solution comprising a head (400), and a motorized power handle (500), the head (400) comprising a hollow endodontic instrument (10) for insertion into the tooth root canal, wherein the hollow endodontic instrument (10) for insertion into the tooth root canal (10) comprises:

a) an inner spicular passage (200) for delivering an irrigation solution,
b) a hollow elongated mesh-like structure (100) for shaping a tooth root canal containing an active part and a coronal part, surrounding the inner spicular passage, and the active part protruding over the length of the inner spicular passage (200), and
c) a suction element (300) forming at least one outer passage for sucking the irrigation solution surrounding the inner spicular passage (200), wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

In FIG. 1 a schematic representation of an embodiment of a dental device (600) according to the invention is depicted.

In the present dental device (600) according to the invention, the irrigation solution such as a sodium hypochlorite solution is delivered through the inner spicular passage (200) to the tooth root canal in order to the disinfect said root canal. The irrigation solution is delivered to the root canal in particular to the apex or apex area. In addition, debris formed by shaping the tooth root canal by means of the hollow elongated mesh-like structure (100) can be washed off the wall of the tooth root canal. The irrigation solution in the tooth root canal along with the debris is sucked out by means of the suction element (300). The sucking of the irrigation solution by the suction element (300) occurs in proximity to the coronal part of the tooth or in the coronal part of the tooth. Thus, the irrigation solution is not delivered to the coronal part of the tooth and sucked out in root canal in particular apex or apex area with the present dental device according to the invention. The delivering of the irrigation solution, the shaping of the tooth root canal, and the sucking of the irrigation solution is performed at the same time. In the state of the art, the three steps have to be performed by the use of at two or three different devices. Herein, the first dental device (600) comprising all the tools being necessary for shaping of and simultaneous flushing and suction a tooth root canal and for sucking the debris and irrigation solution is presented.

The device reduces the treatment time of the tooth root canal since the endodontic instrument does not have to be removed from the subject in order to disinfect the tooth root canal with an irrigation solution and to suck out the used irrigation solution and the debris. Moreover, the use of a rubber dam can be omitted which is usually important to protect the subject from the harmful irrigation solution such as sodium hypochlorite. Thereby, the treatment time caused by the installation of the rubber dam is completely eliminated which results in a remarkably reduced treatment time, and thus the time of suffering for the subject is also significantly reduced. Further, the risk of accident with a harmful irrigation solution in particular sodium hypochlorite is reduced. It is also apparent that the personnel effort is reduced since only one person is needed for the root canal treatment. In addition, the practicability is increased. The loss of dental substance is reduced since the space in the tooth normally required can be minimized due to the use of merely one device.

Moreover, the vibration of the hollow elongated mesh-like structure (100) along with the vibration of the inner spicular needle (200) with the vertical strokes and the path out of the irrigation solution through the middle of the hollow elongated mesh-like structure (100) prevents the formation of a bubble at the end of the root canal when applying an irrigation solution so that an accumulation of microorganism in the area which is not disinfected does not occur. When the endodontic instrument (10) is inside the tooth root canal, the irrigation solution flowing into the canal forms drops at the tip of the hollow elongated mesh-like structure (100). The drops are broken by the vibration of the hollow elongated mesh-like structure (100) and pushed towards the apex. In addition, the inner spicular passage (200) for delivering an irrigation solution allows the irrigation into the center of the endodontic instrument so that the splashing around of the irrigation solution can be reduced.

"Longitudinal axis", as used herein, is defined as follows: An axis being perpendicular to another axis in one plane and longer than said other axis defines the longitudinal axis, and thus the axis being shorter defines the transversal axis.

"Irrigation solution", as used herein, refers to any fluid solution for washing debris from a root canal, and/or for cooling a tooth and/or dental tool, and/or for disinfection of the canal.

The term "head", as used herein, refers to the part of the dental device containing at least an endodontic instrument and a drive arrangement. Moreover, the dental device may also contain an endodontic instrument holder.

The term "hollow elongated mesh-like structure", as used herein, means that the elongated mesh-like structure contains an empty space. It does not exclude the presence of an inner spicular passage. "Elongated", as used herein, refers to the extension of the mesh-like structure along a longitudinal axis. The term "mesh-like structure", as used herein, refers to a three-dimensional body having locally discontinuities therethrough in wall. For example the mesh-like pattern can be like the pattern of a mesh, or a grating and other parts could be free of a mesh or a grating. However, parts of the "mesh-like structure" can be without discontinuities therethrough.

The term "active part", as used herein, refers to the part of the endodontic instrument (10), the part of hollow elongated mesh-like structure (100), or the part of the inner spicular passage (200) which extends in the direction of the apex of the tooth, i.e. the part being closest to the apex of the tooth, when inserted into the tooth root canal. Preferably, the active part of the hollow elongated mesh-like structure (100) is active, i.e. this part is configured in such a way that the tooth root canal can be shaped by cutting the remnant tissue of the tooth root canal.

"Coronal part", as used herein, refers to the part of the endodontic instrument (10) which extends in the direction of the head, i.e. the part of the mesh-like structure which is more remote from the apex, when inserted into the tooth root canal. This part may be at least partially inserted into the coronal part of the tooth. Preferably, the coronal part of the hollow elongated mesh-like structure is inactive, i.e. this part cannot be used for the shaping of the tooth root canal.

"Hollow endodontic instrument", as used herein, means that the endodontic instrument contains empty space. It does not mean that the hollow endodontic instrument is completely empty.

"Drive arrangement", as used herein, refers to arrangement which defines a transmission from the motorized power handle to the endodontic instrument preferably via a tool holder.

"Inner spicular passage", as used herein, refers to passage for the irrigation solution being preferably a hollow needle.

"Motorized power handle", as used herein, refers to a handle, to be held by the user while operating the dental tool from which motive power is supplied to move the endodontic instrument.

The motion may be generated by a motor located within the handle, driven for example by electricity or compressed air, or may be provided via a mechanical linkage from a remote motor. The motorized power handle may be a standard off-the-shelf item, such as is commercially available in handpieces for driving reciprocating endodontic instruments, or may be a dedicated device, optionally integrated with other parts of the dental device (600). A motorized power handle is suitable for the invention when it can rotate at 5,000 rpm (rotation per minute), and contain a ISO-type connection.

For delivering an irrigation solution and suction of the irrigation solution, peristaltic pumps can be used. Such a pump can be found in the SAF pro System or SAF Edge System offered by ReDentNova.

The embodiments of the present invention do not apply ultrasound and do not comprise an ultrasonic transducer for causing ultrasonic movement of the endodontic file. US 2014/0302454 A1 discloses an endodontic device with an ultrasonic tip and an ultrasonic tip assembly. However, also due to the sound, the application of ultrasound is inconvenient to the patient.

The embodiments of the present invention as disclosed herein have most preferably only one inner spicular passage (200) for delivering an irrigation solution and also only one suction element (300) forming at least one outer passage for sucking the irrigation solution. Consequently, in all embodiments disclosed herein, the wording >>an inner spicular passage<< can be replaced by the wording >>one inner spicular passage<< and the wording >>a suction element<< can be replaced by the wording >>one suction element<<.

Moreover, in several tests the inventors found that the following features are essential for a perfect cleaning of the coronal opening and the root canal cavity of the tooth.

Each tooth root canal is different from another in form, size, length, and shape. The endodontic preparation of a tooth root canal requires after opening the tooth root canal a preferably complete mechanical detachment of the pulpal material. The pulpal material is typically infected or necrotic. Thus, any pulpal material remaining in the tooth root canal after the endodontic procedure is a source of potential infection. Thus, an as completely as possible detachment and removal of the pulpal material is essential for a successful endodontic procedure.

For the complete detachment of the pulpal material the structure of the hollow elongated mesh-like structure (100) is important as described in further detail below. Moreover, it is important that the hollow elongated mesh-like structure (100) surrounds the preferably one inner spicular passage (200) and that the active part or the apical part of the hollow elongated mesh-like structure (100) extends the inner spicular passage (200) in apex direction or protrudes over the length of the inner spicular passage (200) in apex direction as evident from FIGS. 4 and 6. Only this arrangement ensures cleaning the tooth root canal down to the apex.

Most preferably the hollow elongated mesh-like structure (100) of at least the apical part or the active part of the hollow elongated mesh-like structure (100) is self-adjustable to the form and shape of the tooth root canal. This self-adjustment is achieved by the special hollow elongated mesh-like structure (100) and is further supported by a material, preferably a metal with shape memory where the hollow elongated mesh-like structure (100) or the active part or at least the apical part thereof is made of.

After and simultaneously to the detachment of the pulpal material, the complete removal of the pulpal material is also essentially required in order to prevent a subsequent infection of the tooth root canal. The removal is performed by means of an irrigation solution which is inserted into the tooth root canal through the preferably one inner spicular passage (200).

There are in principle two ways to flush and suck the tooth root canal with the irrigation solution. The irrigation solution can be inserted into the tooth root canal at its end close to the apex and is sucked out of the tooth root canal from somewhere above the apex up to the top of the coronal opening or the irrigation solution is inserted at or close to the top of the coronal opening and is sucked of the tooth root canal at any location below the insertion point.

Concerning the best way to remove the debris and pulpal material out of the tooth root canal the inventors found out that for well cleaning the apex area, the irrigation solution should be sucked of the tooth root canal or should be inserted into the tooth root canal close to the apex. When sucking of the irrigation solution at the end of the tooth root canal close to the apex, the aspiration needle required a certain inner diameter in order not to get clogged up and closed by the debris and pulpal material to be removed. However, due to the fact that the inner diameter of the tooth root canal gets smaller in apex direction, a sufficiently large aspiration needle cannot be inserted into the tooth root canal sufficiently deep so that the apex area is not sufficiently cleaned and in case the aspiration needle has a sufficiently small diameter, the aspiration needle gets immediately clogged and closed by the debris and pulpal material which shall be removed.

Therefore, the insertion of the irrigation solution has to take place at the end of the tooth root canal close to the apex. In addition, the irrigation solution should be sucked of the tooth root canal at the upper part of the coronal opening close to the surface of the tooth.

For this reason, in the embodiments of the present invention the preferably one suction element (300) forms at least one outer passage for sucking the irrigation solution and surrounds the inner spicular passage (200).

Surrounding the preferably one inner spicular passage (200) by the preferably one suction element (300) does not mean that the suction element (300) is wound around the inner spicular passage (200) like a spiral. The arrangement of the suction element (300) to the inner spicular passage (200) is like a tube-in-tube arrangement. The inner spicular passage (200) is hollow like a tube through which the irrigation solution is inserted into the tooth root canal at the apex or close to the apex and the suction element (300) is arranged like a tube around the inner spicular passage (200) like a tube-in-tube arrangement. In between the suction element (300) as outer tube and the inner spicular passage (200) as inner tube, the hollow elongated mesh-like structure (100) could be positioned fully around the inner tube, i.e. surrounding the inner spicular passage (200) like a wire mesh. Alternatively the hollow elongated mesh-like structure (100) could be arranged as extension of the suction element (300) having the same or almost the same diameter as the suction element (300). This tube-in-tube structure of the inner spicular passage (200) surrounded by the hollow elongated mesh-like structure (100) and also surrounded by the suction element (300) ensures a sufficiently large inner diameter of the suction element (300) so that clogging the suction element (300) is completely prevented.

Consequently, the wording >>a suction element (300) forming at least one outer passage for sucking the irrigation solution surrounding the inner spicular passage (200)<< can be replaced in all embodiments disclosed herein by >>a suction element (300) forming at least one outer passage for sucking the irrigation solution surrounding the inner spicular passage (200) in a tube-in-tube arrangement<<.

Consequently, the present application relates to a hollow endodontic instrument (10) for shaping and simultaneous flushing and suction a tooth root canal comprising:
  a) an inner spicular passage (200) for delivering an irrigation solution,
  b) a hollow elongated mesh-like structure (100) for shaping a tooth root canal containing an active part and a coronal part, surrounding the inner spicular passage (200), and the active part protruding over the length of the inner spicular passage (200), and
  c) a suction element (300) forming at least one outer passage for sucking the irrigation solution surrounding the inner spicular passage (200) in a tube-in-tube arrangement,
wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

Consequently, the present application relates also to a dental device (600) for shaping and simultaneous flushing and suction a tooth root canal by shaping the tooth root canal with a hollow elongated mesh-like structure (100) while flushing the tooth root canal with an irrigation solution comprising a head (400), and a motorized power handle (500), the head (400) comprising a hollow endodontic instrument (10) for insertion into the tooth root canal, wherein the hollow endodontic instrument (10) for insertion into the tooth root canal (10) comprises:
- a) an inner spicular passage (200) for delivering an irrigation solution,
- b) a hollow elongated mesh-like structure (100) for shaping a tooth root canal containing an active part and a coronal part, surrounding the inner spicular passage (200), and the active part protruding over the length of the inner spicular passage (200), and
- c) a suction element (300) forming at least one outer passage for sucking the irrigation solution surrounding the inner spicular passage (200) in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The above disclosed features of the embodiments disclosed herein provide considerable advantages over the state of the art embodiments.

For instance, FIG. 9 of US 2014/0302454 A1 is shown herein as FIG. 10. This state of the art embodiment incorporates multiple needles/wires [53] (e.g., irrigation needles) around the perimeter of an inner needle [52] (e.g., aspiration needle). It is appreciated that the needle/wire [53] may be a hollow irrigation needle or a solid wire. The individual needles [53] are different in lengths and will have nodes and anti-nodes. These nodes and anti-nodes will be at various depths in the canal creating more acoustic streaming and agitation all along the depth of the canal. The individual needles/wires [53] will also have sharp edges [60] on their tips [62] creating more points of cavitation. When the needle/wire [53] are provided as a solid wire, irrigant may be supplied through the opening [12] (at the distal free end [10]) of the housing [11] along spaces [85] between the wires [53] and the aspiration needle [52].

This state of the art embodiment has several drawbacks over the embodiments of the present invention. The needles/wires [53] do not detach the pulpal material as effectively as the hollow elongated mesh-like structure (100) of the present embodiments. Moreover the needles/wires [53] do not protrude over the length of the aspiration needle [52] so that the apex area is not perfectly cleaned and the irrigation solution is inserted in the upper part of the tooth root canal and sucked of in the lower part of the tooth root canal closer to the apex through the aspiration needle [52] which is clogged up soon by the debris and pulpal material which should be removed. This results finally in a suboptimal cleaning of the tooth root canal.

A further embodiment according to the invention is directed to a dental device (600) for shaping and simultaneous flushing and suction a tooth root canal by shaping the tooth root canal with a hollow elongated mesh-like structure (100) while flushing the tooth root canal with an irrigation solution comprising a head (400), and a motorized power handle (500), the head (400) comprising a hollow endodontic instrument (10) for insertion into the tooth root canal, wherein the hollow endodontic instrument (10) for insertion into the tooth root canal comprises:
- a) an inner spicular passage (200) for delivering an irrigation solution at a negative pressure to the interior of the tooth by circulating and refreshing of a irrigation solution in particular sodium hypochlorite without the penetration the apex, wherein the circulating of material is performed by the inlet pushing and outlet suction made by the head,
- b) a hollow elongated mesh-like structure (100) enable the endodontic instrument (10) to adjust itself to the root canal anatomy for shaping a tooth root canal containing an active part and a coronal part, surrounding the inner spicular passage (200), and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

In FIG. 1 a schematic representation of an embodiment of a dental device (600) according to the invention is depicted.

The head (400) of the endodontic device according to the state of the art has to be configured in such a way that the irrigation solution can be sucked from the canal while the tooth root canal is shaped by a single device in order to reduce the treatment time, to reduce the risk of an accident with a harmful irrigation solution in particular sodium hypochlorite, to increase the practicability, to reduce personnel effort during treatment, and/or to reduce the required space in the tooth for the root canal treatment, i.e. to reduce the loss of dental substance.

Thus, another aspect according to the present invention is directed to a head (400) of a dental device (600) for shaping and simultaneous flushing and suction a tooth root canal by shaping the tooth root canal with a hollow elongated mesh-like structure (100) while flushing the tooth root canal with an irrigation solution, the head (400) comprising a hollow endodontic instrument (10) for insertion into the tooth root canal (10) as described herein.

Thus, another aspect according to the present invention is related to a head (400) of a dental device (600) for shaping and simultaneous flushing and suction a tooth root canal by shaping the tooth root canal with a hollow elongated mesh-like structure (100) while flushing the tooth root canal with an irrigation solution, the head (400) comprising a hollow endodontic instrument (10) for insertion into the tooth root canal, wherein the hollow endodontic instrument (10) for insertion into the tooth root canal comprises:
- a) an inner spicular passage (200) for delivering an irrigation solution,
- b) a hollow elongated mesh-like structure (100) for shaping a tooth root canal containing an active part and a coronal part, surrounding the inner spicular passage, and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300)

surrounds at least a portion of the hollow elongated mesh-like structure (100) and/or is located in the coronal part of the hollow elongated mesh-like structure (100). An example of a head (400) is depicted in FIG. 2.

An embodiment according to the present invention is related to a head (400) of a dental device (600) for shaping and simultaneous flushing and suction a tooth root canal by shaping the tooth root canal with a hollow elongated mesh-like structure (100) while flushing the tooth root canal with an irrigation solution, the head (400) comprising a hollow endodontic instrument (10) for insertion into the tooth root canal, wherein the hollow endodontic instrument (10) for insertion into the tooth root canal comprises:
  a) an inner spicular passage (200) for delivering an irrigation solution at a negative pressure to the interior of the tooth by circulating and refreshing of a irrigation solution in particular sodium hypochlorite without the penetration the apex, wherein the circulating of material is performed by the inlet pushing and outlet suction made by the head,
  b) a hollow elongated mesh-like structure (100) enable the endodontic instrument (10) to adjusted itself to the root canal anatomy for shaping a tooth root canal containing an active part and a coronal part, surrounding the inner spicular passage, and the active part protruding over the length of the inner spicular passage (200), and
  c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The head (400) of a dental device (600), and thus also the dental device (600) can contain a port for delivering an irrigation solution to a tooth root canal (430) and a port for sucking an irrigation solution from a tooth root canal (440). An embodiment according to the invention is thus directed to a head (400) as described herein, wherein the head (400) contains a port for delivering an irrigation solution to a tooth root canal (430) and a port for sucking an irrigation solution from a tooth root canal (440).

Thus, an embodiment according to the present invention is related to a head (400) of a dental device (600) for shaping and simultaneous flushing and suction a tooth root canal by shaping the tooth root canal with a hollow elongated mesh-like structure (100) while flushing the tooth root canal with an irrigation solution, the head (400) comprising a hollow endodontic instrument (10) for insertion into the tooth root canal, wherein the hollow endodontic instrument (10) for insertion into the tooth root canal comprises:
  a) an inner spicular passage (200) for delivering an irrigation solution,
  b) a hollow elongated mesh-like structure (100) for shaping a tooth root canal containing an active part and a coronal part, surrounding the inner spicular passage, and the active part protruding over the length of the inner spicular passage (200), and
  c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100), and wherein the head (400) contains a port (430) for delivering an irrigation solution to a tooth root canal and a port (440) for sucking an irrigation solution from a tooth root canal.

The port (440) for sucking an irrigation solution from a tooth root canal and the port (430) for delivering an irrigation solution to a tooth root canal can be spatial separated, wherein said ports are separated if the ports are not in contact or surrounded by each other, or preferably the port (440) for sucking an irrigation solution from a tooth root canal is positioned at least partially around the port (430) for delivering an irrigation solution to a tooth root canal. Therefore, the head (400) of a dental device (600), and thus also the dental device (600) can contain a port (430) for delivering an irrigation solution to a tooth root canal and a port (440) for sucking an irrigation solution from a tooth root canal, wherein the port (440) for sucking an irrigation solution from a tooth root canal is positioned at least partially around the port (430) for delivering an irrigation solution to a tooth root canal. Thus, an embodiment according to the invention is directed to a head (400) as described herein, wherein the port (440) for sucking an irrigation solution from a tooth root canal is positioned at least partially around the port (430) for delivering an irrigation solution to a tooth root canal.

Therefore, an embodiment according to the present invention is related to a head (400) of a dental device (600) for shaping and simultaneous flushing and suction a tooth root canal by shaping the tooth root canal with a hollow elongated mesh-like structure (100) while flushing the tooth root canal with an irrigation solution, the head (400) comprising a hollow endodontic instrument (10) for insertion into the tooth root canal, wherein the hollow endodontic instrument (10) for insertion into the tooth root canal comprises:
  a) an inner spicular passage (200) for delivering an irrigation solution,
  b) a hollow elongated mesh-like structure (100) for shaping a tooth root canal containing an active part and a coronal part, surrounding the inner spicular passage, and the active part protruding over the length of the inner spicular passage (200), and
  c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100), wherein the head (400) contains a port (430) for delivering an irrigation solution to a tooth root canal and a port (440) for sucking an irrigation solution from a tooth root canal, and wherein the port (440) for sucking an irrigation solution from a tooth root canal is positioned at least partially around the port (430) for delivering an irrigation solution to a tooth root canal.

The head (400) of the dental tool (600), and thus also the dental device (600) contains a drive arrangement (450). An example of such a drive arrangement is described in the international patent application WO 2010/150125 A2. Preferably, the drive arrangement is configured in such a way that the rotation of the endo motor is transformed into rotation and vertical vibration as described in international patent application WO 2010/150125 A2.

Moreover, an endodontic instrument of the state of the art has to be configured in such a way that the irrigation solution can be sucked from the canal while the tooth root canal is shaped by a single device in order to reduce the treatment time, to reduce the risk of an accident with a harmful irrigation solution in particular sodium hypochlorite, to increase the practicability, to reduce personnel effort during treatment, and/or to reduce the required space in the tooth for the root canal treatment, i.e. to reduce the loss of dental substance.

Thus, another aspect according to the present invention is related to a hollow endodontic instrument (10) for shaping and simultaneous flushing and suction a tooth root canal comprising:
- a) an inner spicular passage (200) for delivering an irrigation solution,
- b) a hollow elongated mesh-like structure (100) for shaping a tooth root canal containing an active part and a coronal part, surrounding the inner spicular passage, and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

An embodiment according to the present invention is related to a hollow endodontic instrument (10) for shaping and simultaneous flushing and suction a tooth root canal comprising:
- a) an inner spicular passage (200) for delivering an irrigation solution at a negative pressure to the interior of the tooth by circulating and refreshing of a irrigation solution in particular sodium hypochlorite without the penetration the apex, wherein the circulating of material is performed by the inlet pushing and outlet suction made by the head,
- b) a hollow elongated mesh-like structure (100) enable the endodontic instrument (10) to adjust itself to the root canal anatomy for shaping a tooth root canal containing an active part and a coronal part, surrounding the inner spicular passage, and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The endodontic instrument (10) is able to confirm its volume and contour to the perimeter of the local cross section of the tooth root canal due to the mesh-like structure.

The inner spicular passage (200) can be made of at least one material selected from the group comprising or consisting of polymer preferably being resistant against gamma radiation and sodium hypochlorite or stainless steel, more preferably stainless steel. Therefore, an embodiment according to the invention is directed to a hollow endodontic instrument (10) as described herein, wherein the inner spicular passage (200) for delivering an irrigation solution is made of a polymer preferably being resistant against gamma radiation and sodium hypochlorite or stainless steel, more preferably stainless steel.

Thus, an embodiment according to the present invention is related to a hollow endodontic instrument (10) for shaping and simultaneous flushing and suction a tooth root canal comprising:
- a) an inner spicular passage (200) for delivering an irrigation solution, wherein the inner spicular passage (200) for delivering an irrigation solution is made of a polymer preferably being resistant against gamma radiation and sodium hypochlorite or stainless steel, more preferably stainless steel,
- b) a hollow elongated mesh-like structure (100) for shaping a tooth root canal containing an active part and a coronal part, surrounding the inner spicular passage, and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The inner spicular passage (200) comprises or consists of an apical part (210), and coronal part (220), and a holder part (230). The apical part (210) and the coronal part (220) can be made of stainless steel and the holder part (230) made of a plastic material. More preferably the holder is an over molded plastic material. Still more preferably the coronal part (220) made of stainless steel is over molded by the holder part (230).

More preferably, the apical part (210) is made of stainless steel, and the coronal part and the holder part are made of a plastic material. More preferably the holder is an over molded plastic material. Still more preferably the apical part (210) made of stainless steel is over molded by the coronal (220) and holder part (230).

The inner spicular passage (200) is preferably a hollow needle. Thus, an embodiment according to invention is directed to a hollow endodontic instrument (10) as described herein, wherein the inner spicular passage (200) is a hollow needle.

Therefore, an embodiment according to the invention is related to a hollow endodontic instrument (10) for shaping and simultaneous flushing and suction a tooth root canal comprising:
- a) an inner spicular passage (200) for delivering an irrigation solution, wherein the inner spicular passage (200) is a hollow needle,
- b) a hollow elongated mesh-like structure (100) for shaping a tooth root canal containing an active part and a coronal part, surrounding the inner spicular passage, and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The part for the tooth of the inner spicular passage (200) can comprise an active part and a coronal part. The inner spicular passage (200) can additionally comprise a holder part (230). Therefore, inner spicular passage (200) can comprise an apical part (210), coronal part (220), and additionally a holder part (230).

Furthermore, the inner spicular passage (200) can taper along a longitudinal axis of the inner spicular passage (200) for delivering an irrigation solution in the direction of the tip of the inner spicular passage (200). Preferably the apical part tapers in the direction of the tip of the inner spicular passage (200). The taper of the inner spicular passage (200) can be from 01 to 12, preferably from 02 to 10, more preferably from 02 to 09, more preferably from 02 to 08, more preferably from 02 to 07, and more preferably from 02 to 06. The taper corresponds to the size (¹⁄₁₀₀) mm, i.e. if the taper is 01, the diameter changes by 0.01 after 1 mm along the length. Therefore, the taper is defined as the change of the diameter after a distance 1 mm. A taper of 02 means that the diameter increases by 0.02 mm after 1 mm along the length. For example, if the tip of the inner spicular passage (200) has a diameter of e.g. 0.15 mm and a taper of 02 the diameter would be 0.17 mm after 1 mm along the length of the inner spicular passage. Preferably, the inner spicular passage (200) is cylindrical. However, the inner spicular passage (200) can consist of various cylindrical elements, wherein the diameter of said cylindrical elements can be different from each other. The cylindrical elements of the inner spicular passage (200) can be an apical part (210), coronal part (220) and a holder part (230), as described in detail below.

The tip of spicular passage (200) also called the initial diameter of the spicular passage (200) can be from 0.05 to 1.5 mm, preferably from 0.075 mm to 1.25, more preferably from 0.1 mm to 1, more preferably from 0.125 mm to 0.75, more preferably from 0.15 mm to 0.7, more preferably from 0.175 mm to 0.65, more preferably from 0.2 mm to 0.6, more preferably from 0.2 mm to 0.5, more preferably from 0.2 mm to 0.4, more preferably from 0.2 to 0.3 mm, and most preferably 0.26 mm. The "tip of the inner spicular part" is the point of the hollow elongated mesh-like structure (200) being closest to the apex of the tooth when inserted into the tooth root canal and preferably the narrowest part of the inner spicular passage (200).

The length of the inner spicular passage (200) for delivering an irrigation solution to a tooth root canal can be from 0 to 50 mm, preferably from 5 mm to 47.5 mm, 10 mm to 45 mm, preferably from 12 to 42.5 mm, more preferably from 14 to 40 mm, still more preferably from 16 to 37.5, still more preferably from 18 to 35 mm, still more preferably from 20 to 32.5 mm, and most preferably from 21 to 31 mm. The outer diameter of the inner spicular passage (200) for delivering an irrigation solution to a tooth root canal can be from 0.05 to 1.5 mm, preferably from 0.075 mm to 1.25, more preferably from 0.1 mm to 1, more preferably from 0.125 mm to 0.9, more preferably from 0.15 mm to 0.85, and more preferably from 0.2 mm to 0.8. mm If the inner spicular passage tapers a longitudinal axis of the inner spicular passage (200) for delivering an irrigation solution in the direction of the tip of the inner spicular passage (200), the diameter of the inner spicular passage (200) refers to the diameter of the largest diameter. If the inner spicular passage (200) comprises an apical part, coronal part, and additionally a holder part, and when the inner spicular passage tapers a longitudinal axis of the inner spicular passage (200) for delivering an irrigation solution in the direction of the tip of the inner spicular passage (200), the outer diameter of the inner spicular passage (200) then refers to the diameter of the coronal part.

The coronal part of the inner spicular passage (200) may be conical or preferably cylindrical.

Thus, an embodiment according to the invention is directed to a hollow endodontic instrument (10) as described herein, wherein the inner spicular passage (200) for delivering an irrigation solution to a tooth root canal has an outer diameter from 0.2 to 0.6 mm a length from 21 to 31 mm.

Therefore, an embodiment according to the present invention is directed to a hollow endodontic instrument (10) for shaping and simultaneous flushing and suction a tooth root canal comprising:
  a) an inner spicular passage (200) for delivering an irrigation solution, wherein the inner spicular passage (200) for delivering an irrigation solution to a tooth root canal has an outer diameter from 0.2 to 0.6 mm a length from 21 to 31 mm,
  b) a hollow elongated mesh-like structure (100) for shaping a tooth root canal containing an active part and a coronal part, surrounding the inner spicular passage, and the active part protruding over the length of the
  c) a suction element (300) forming at least one outer passage for sucking the irrigation solution surrounding the inner spicular passage (200) preferably in a tube-in-tube arrangement,
wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

In an inner spicular passage comprising a holder part (230), a coronal part (220) and an apical part (210) the length of the apical part (210) can range from 0 to 30 mm, and the length of coronal part (220) can range from 0 to 20 mm, and the length of the holder part (230) can range from 0 to 7 mm. Preferably, the length of the holder part (230) ranges from 1 to 5 mm. Preferably, the length of the coronal part ranges from 1 to 15 mm. The inner spicular passage (200) for delivering an irrigation solution allows the irrigation into the center of the endodontic instrument so that the splashing around of the irrigation solution can be reduced.

The inner diameter of the inner spicular passage (200) for delivering an irrigation solution to a tooth root canal is preferably from 0.1 mm to 0.5 mm.

The wall thickness of the inner spicular passage (200) can be from 0.01 to 0.6 mm, preferably from 0.02 to 0.5 mm, more preferably from 0.03 to 0.4 mm, more preferably from 0.04 to 0.3 mm, and more preferably from 0.05 to 0.25.

The endodontic file may adapt itself to the root canal so that an enlargement of the root canal can be restricted and the ablation of healthy dentin weakening the tooth structure is reduced. For this, hollow elongated mesh-like structure (100) for shaping a tooth root canal can have a diameter from 0.3 mm to 3.5 mm, preferably from 0.4 to 3.0 mm, more preferably from 0.5 to 2.5 mm, still more preferably from 0.6 to 2.4, still more preferably from 0.7 to 2.2 mm, still more preferably from 0.8 to 2.1 mm, and most preferably from 0.9 to 2 mm. The hollow elongated mesh-like structure for shaping a tooth root canal can have a length from 10 mm to 45 mm, preferably from 12 to 42.5 mm, more preferably from 14 to 40 mm, still more preferably from 16 to 37.5, still more preferably from 18 to 35 mm, still more preferably from 20 to 32.5 mm, and most preferably from 21 to 31 mm. If the hollow elongated mesh-like structure tapers along its longitudinal axis in the direction of the tip of the hollow elongated mesh-like structure, the diameter of the hollow elongated mesh-like structure (100) refers to the largest diameter. Preferably, the diameter of the hollow elongated mesh-like structure (100) is the outer diameter of the hollow elongated mesh-like structure (100).

Thus, an embodiment according to the invention is directed to a hollow endodontic instrument (10) as described herein, wherein the hollow elongated mesh-like structure (100) for shaping a tooth root canal has a length from 21 to 31 mm, and a diameter from 0.9 to 2 mm.

Thus, an embodiment according to the present invention is directed to a hollow endodontic instrument (10) for shaping and simultaneous flushing and suction a tooth root canal comprising:
  a) an inner spicular passage (200) for delivering an irrigation solution,
  b) a hollow elongated mesh-like structure (100) for shaping a tooth root canal containing an apical part and a coronal part, surrounding the inner spicular passage, and the apical part protruding over the length of the inner spicular passage (200), wherein the hollow elongated mesh-like structure (100) for shaping a tooth root canal has a length from 21 to 31 mm, and a diameter from 0.9 to 2 mm, and
  c) a suction element (300) forming at least one outer passage for sucking the irrigation solution surrounding the inner spicular passage (200) preferably in a tube-in-tube arrangement,
wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The length of the active part of the hollow elongated mesh-like structure (100) can be from 5 to 30 mm, preferably from 6 to 29 mm, more preferably from 7 to 28 mm, more preferably from 8 to 27 mm, more preferably from 9 to 26 mm, more preferably from 10 to 25 mm, more preferably from 11 to 24 mm, more preferably from 12 to 23 mm, more preferably from 13 to 22 mm, more preferably from 14 to 22 mm, more preferably from 15 to 22 mm, more preferably from 15 to 22 mm, most preferably from 16 to 21 mm.

The length of the coronal part of the hollow elongated mesh-like structure (100) can be from 2 to 10 mm, preferably from 2.5 to 10 mm, more preferably from 3 to 10 mm, more preferably from 3.5 to 10 mm, more preferably from 4 to 10 mm, and most preferably from 5 to 10 mm.

The ratio between the length of the active part of the hollow elongated mesh-like structure (100) and the coronal part of the hollow elongated mesh-like structure (100) can be from 1 to 10, preferably from 1.1 to 9, more preferably form 1.2 to 8, more preferably from 1.3 to 7, more preferably from 1.4 to 6, more preferably from 1.5 to 7, more preferably from 1.6 to 6, more preferably from 1.7 to 5, more preferably from 1.8 to 4.5, more preferably from 1.9 to 4, more preferably from 2.0 to 3.5, and most preferably from 2.1 to 3.2.

The ratio between the length of the active part of the hollow elongated mesh-like structure (100) and the whole length of the hollow elongated mesh-like structure (100) can be from 0.3 to 1.0, preferably from 0.35 to 0.9, more preferably from 0.4 to 0.85, more preferably from 0.5 to 0.85, more preferably from 0.6 to 0.8, and most preferably from 0.67 to 0.77.

Moreover, the tip of the hollow elongated mesh-like structure (100) also called the initial size of the active part of the hollow elongated mesh-like structure (100) can have a diameter from 0.01 to 0.7 mm, preferably from 0.05 to 0.65 mm, more preferably from 0.1 to 0.6, more preferably from 0.15 to 0.6, and more preferably from 0.2 to 0.6 mm.

The wall thickness of the hollow elongated mesh-like structure (100) can be from 0.01 to 0.3 mm, preferably from 0.02 to 0.29 mm, more preferably from 0.03 to 0.28 mm, more preferably from 0.04 to 0.27 mm, more preferably from 0.05 to 0.26 mm, more preferably from 0.06 to 0.25 mm, more preferably from 0.07 to 0.24 mm, more preferably from 0.08 to 0.23 mm.

Furthermore, the inner spicular passage (200) can taper along a longitudinal axis of along a longitudinal axis of the inner spicular passage (200) for delivering an irrigation solution, respectively in the direction of the tip of the hollow elongated mesh-like structure (100) or in the direction of the tip of the inner spicular passage, respectively. Thus, an embodiment according to present invention is directed to a hollow endodontic instrument (10) as described herein, wherein the hollow elongated mesh-like structure (100) and/or the inner spicular passage (200) tapers along a longitudinal axis (101) of the hollow elongated metal-like structure (100) or along a longitudinal axis (201) of the inner spicular passage (200) for delivering an irrigation solution.

Therefore, an embodiment according to the present invention is related to a hollow endodontic instrument (10) for shaping and simultaneous flushing and suction a tooth root canal comprising:
  a) an inner spicular passage (200) for delivering an irrigation solution,
  b) a hollow elongated mesh-like structure (100) for shaping a tooth root canal containing an active part and a coronal part, surrounding the inner spicular passage, and the active part protruding over the length of the inner spicular passage (200), and
  c) a suction element (300) forming at least one outer passage for sucking the irrigation solution surrounding the inner spicular passage (200) preferably in a tube-in-tube arrangement,
wherein the inner spicular passage (200) is insertable into the tooth root canal, wherein the suction element (300) surrounds at least a portion of the hollow elongated mesh-like structure (100) and/or is located in the coronal part of the hollow elongated mesh-like structure (100), and the inner spicular passage (200) tapers the longitudinal axis of the inner spicular passage (200), respectively for delivering an irrigation solution.

Preferably, the inner spicular passage (200) is cylindrical.

The preferably cylindrical inner spicular passage (200) is partially surrounded by the suction element (300) which is also preferably cylindrical in form of a tube-in-tube arrangement. That means the preferably cylindrical suction element (300) surrounds like a tube partially, i.e. surrounds in the holder part (23) and/or in the coronal part (220) the preferably cylindrical inner spicular passage (200) so that a tube-in-tube arrangement results. In the apical part (210) the inner spicular passage (200) is surrounded like a wire mesh by the hollow elongated mesh-like structure (100) which protrudes over the length of the inner spicular passage (200). This tube-in-tube arrangement ensures a sufficient capacity and a sufficient volume between the inner tube, the inner spicular passage (200), and the outer tube, the suction element (300), so that no clogging and no sealing of the debris and irrigation solution removal lines occurs. The volume of irrigation solution which can be removed through the space between the inner spicular passage (200) and the suction element (300) is at least two times higher, preferably three times higher, more preferably four times higher, more preferably five times higher, more preferably six times higher, more preferably seven times higher, more preferably eight times higher, more preferably nine times higher, more preferably ten times higher than the volume of irrigation solution which can be inserted through the inner spicular passage (200) into the tooth root canal.

The coronal part (220) of the hollow elongated mesh-like structure (100) may be conical or preferably cylindrical. The coronal part (220) of the hollow elongated mesh-like structure (100) can be or comprise a hollow shaft (170). In addition, the shaft can be cylindrical or conical or comprise a cylindrical or conical part.

Thus, an embodiment according to the invention is directed to a hollow endodontic instrument (10) as described herein, wherein coronal part of the hollow elongated mesh-like structure (100) for shaping a tooth root canal contains a hollow shaft (170).

Therefore, an embodiment according to the present invention is related to a hollow endodontic instrument (10) for shaping and simultaneous flushing and suction a tooth root canal comprising:
 a) an inner spicular passage (200) for delivering an irrigation solution,
 b) a hollow elongated mesh-like structure (100) for shaping a tooth root canal containing an active part and a coronal part, surrounding the inner spicular passage, and the active part protruding over the length of the inner spicular passage (200), wherein the coronal part of the hollow elongated mesh-like structure (100) for shaping a tooth root canal contains a hollow shaft (170), and
 c) a suction element (300) forming at least one outer passage for sucking the irrigation solution surrounding the inner spicular passage (200) preferably in a tube-in-tube arrangement,
wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The hollow elongated mesh-like structure (100) can be made of a material selected from the group comprising or consisting of a polymer, a metal, and a metal alloy wherein a metal alloy is preferred. Thus, an embodiment according to the invention is directed to a hollow endodontic instrument (10) as described herein, wherein the hollow elongated mesh-like structure (100) is made of a metal or a metal alloy.

Thus, an embodiment according to the present invention is related to a hollow endodontic instrument (10) for shaping and simultaneous flushing and suction a tooth root canal comprising:
 a) an inner spicular passage (200) for delivering an irrigation solution,
 b) a hollow elongated mesh-like structure (100) for shaping a tooth root canal containing an active part and a coronal part, surrounding the inner spicular passage, and the active part protruding over the length of the inner spicular passage (200), wherein the hollow elongated mesh-like structure (100) is made of a metal or a metal alloy, and
 c) a suction element (300) forming at least one outer passage for sucking the irrigation solution surrounding the inner spicular passage (200) preferably in a tube-in-tube arrangement,
wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The hollow elongated mesh-like structure can be made of a nickel-titanium alloy. Thus, an embodiment according to the invention is directed to a hollow endodontic instrument (10) as described herein, wherein the hollow elongated mesh-like structure (100) is made of a nickel-titanium alloy.

Therefore, an embodiment according to the present invention is related to a hollow endodontic instrument (10) for shaping and simultaneous flushing and suction a tooth root canal comprising:
 a) an inner spicular passage (200) for delivering an irrigation solution,
 b) a hollow elongated mesh-like structure (100) for shaping a tooth root canal containing an active part and a coronal part, surrounding the inner spicular passage, and the active part protruding over the length of the inner spicular passage (200), wherein the hollow elongated mesh-like structure (100) is made of a nickel-titanium alloy, and
 c) a suction element (300) forming at least one outer passage for sucking the irrigation solution surrounding the inner spicular passage (200) preferably in a tube-in-tube arrangement,
wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The hollow elongated mesh-like structure has preferably shape memory properties and superelastic properties. Thus, an embodiment according to the invention is directed to a hollow endodontic instrument (10) as described herein, wherein the hollow elongated mesh-like structure (100) has shape memory properties and superelastic properties.

Therefore, an embodiment according to the present invention is related to a hollow endodontic instrument (10) for shaping and simultaneous flushing and suction a tooth root canal comprising:
 a) an inner spicular passage (200) for delivering an irrigation solution,
 b) a hollow elongated mesh-like structure (100) for shaping a tooth root canal containing an active part and a coronal part, surrounding the inner spicular passage, and the active part protruding over the length of the inner spicular passage (200), wherein the hollow elongated mesh-like structure (100) has shape memory properties and superelastic properties, and
 c) a suction element (300) forming at least one outer passage for sucking the irrigation solution surrounding the inner spicular passage (200) preferably in a tube-in-tube arrangement,
wherein the inner spicular passage (200) is insertable into the tooth root canal and wherein the suction element (300) surrounds at least a portion of the hollow elongated mesh-like structure (100) and/or is located in the coronal part of the hollow elongated mesh-like structure (100).

As used herein shape memory is a phenomenon, in which a material recovers to its original size and shape when heated above a certain characteristic transformation temperature. When a metal with shape memory is in martensite form at lower temperatures, the metal or alloy can easily be deformed into any shape. When the metal or alloy is heated, it goes through transformation from martensite to austenite. In the austenite phase, the metal or alloy remembers the shape it had before it was deformed.

A metal alloy with super elastic properties suitable for the metal mesh is, for example, a binary nickel-titanium alloy, wherein two elements are present in roughly equal atomic percentages, preferably from 45 wt % to 60 wt % nickel, more preferably 47.5 wt %-59 wt %, more preferably from 50 wt % to 58 wt %, more preferably form 51 wt % to 57 wt %, more preferably form 52 wt % to 57 wt %, more preferably form 51 wt % to 57 wt %, more preferably form 52 wt % to 57 wt %, more preferably form 53 wt % to 57 wt %, more preferably form 54 wt % to 57 wt %, and most preferably from 54.5 wt % to 57 wt %. An example is Nitinol 55 (about 55% nickel; nominally Ni-45 wt % Ti)).

When the endodontic instrument (10) is inserted into a narrow canal, whose nominal diameter is less than its own nominal diameter, the instrument is compressed, its super-elastic property allowing it to adapt itself to the cross-sectional shape of the walls of the canal in each radial plane along the longitudinal axis of the canal. Rotating in the canal it removes tissue and debris from the canal and the canal wall. As the debris is removed from the canal wall, the super elastic property of the hollow elongated mesh-like structure (100) of the endodontic instrument (10) causes it to gradually expand with time in the radial direction while continually maintaining contact with the canal wall at every point. Thus material is uniformly removed from the dentinal walls of the canal until the desired nominal diameter is achieved.

The active part of the hollow elongated mesh-like structure (10) can comprise longitudinal elements (110) and circumferential elements (120) that connect adjacent longitudinal elements (110).

The longitudinal elements (110) of the hollow elongated mesh-like structure (100) can be straight or curved elements and/or the circumferential elements (120) of the hollow elongated mesh-like structure (100) can be straight or curved elements.

As evident from FIG. 9 the hollow elongated mesh-like structure (100) or more precisely the active part of the hollow elongated mesh-like structure (100) comprises preferably between 2 and 6 longitudinal elements (110) and preferably between 3 and 15, more preferably between 4 and 12, more preferably between 5 and 10 circumferential elements (120). Nodes (130) are the connections of the circumferential elements (120) with the longitudinal elements (110). Moreover at least two of the longitudinal elements (110) converge in the cusp (140) or in one cusp (140). The cusp (140) is the final tip of the hollow elongated mesh-like structure (100) which comes closest to the apex. It was found that embodiments with this cusp (140) are preferred, because this cusp (140) and especially this cusp (140) together with the self-adjusting property of at least the apical part or the complete active part ensures a perfect cleaning of the sensitive and damageable apex region. Thus, the hollow elongated mesh-like structure (100) or more precisely the active part of the hollow elongated mesh-like structure (100) consists of at least two longitudinal elements (110) which are connected through circumferential elements (120). At least two of the longitudinal elements (110) converge in the cusp (140) or in one cusp (140). The longitudinal elements (110) extend preferably along the longitudinal axis of the inner spicular passage (200) and the circumferential elements (120) go around or surround the inner spicular passage (200).

Thus, the active part of the hollow elongated mesh-like structure (100) for shaping a tooth root canal comprises longitudinal elements (110) and circumferential elements (120) that connect adjacent longitudinal elements (110).

Thus, the present application relates to a hollow endodontic instrument (10) for shaping and simultaneous flushing and suction a tooth root canal comprising:
   a) an inner spicular passage (200) for delivering an irrigation solution,
   b) a hollow elongated mesh-like structure (100) for shaping a tooth root canal containing an active part and a coronal part, surrounding the inner spicular passage, and the active part protruding over the length of the inner spicular passage (200) and the active part comprises longitudinal elements (110) and circumferential elements (120) that connect adjacent longitudinal elements (110), and
   c) a suction element (300) forming at least one outer passage for sucking the irrigation solution surrounding the inner spicular passage (200) preferably in a tube-in-tube arrangement,
wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The present application refers also to a head (400) comprising the hollow endodontic instrument (10) and a dental device (600) comprising the head (400).

Moreover, the present application relates to a hollow endodontic instrument (10) for shaping and simultaneous flushing and suction a tooth root canal comprising:
   a) an inner spicular passage (200) for delivering an irrigation solution,
   b) a hollow elongated mesh-like structure (100) for shaping a tooth root canal containing an active part and a coronal part, surrounding the inner spicular passage, and the active part protruding over the length of the inner spicular passage (200) and the active part comprises longitudinal elements (110) and circumferential elements (120) that connect adjacent longitudinal elements (110) and at least two of the longitudinal elements (110) converge in one cusp (140), and
   c) a suction element (300) forming at least one outer passage for sucking the irrigation solution surrounding the inner spicular passage (200) preferably in a tube-in-tube arrangement,
wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The present application refers also to a head (400) comprising the hollow endodontic instrument (10) and a dental device (600) comprising the head (400).

Neither the circumferential elements (120) nor the longitudinal elements (110) are hollow and are used for flushing or sucking a liquid such as an irrigation solution.

The circumferential elements (120) and the longitudinal elements (110) are preferably self-adjustable so that the active part and the apical part (210) of the hollow elongated mesh-like structure (100) can adjust itself to the form and shape, i.e to the anatomy of the tooth root canal for optimal cleaning.

Thus, the present application relates to a hollow endodontic instrument (10) for shaping and simultaneous flushing and suction a tooth root canal comprising:
   a) an inner spicular passage (200) for delivering an irrigation solution,
   b) a hollow elongated mesh-like structure (100) for shaping a tooth root canal containing an active part and a coronal part, surrounding the inner spicular passage, and the active part protruding over the length of the inner spicular passage (200) and the active part of the hollow elongated mesh-like structure (100) is self-adjustable to the anatomy of the tooth root canal, and c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The present application refers also to a head (400) comprising the hollow endodontic instrument (10) and a dental device (600) comprising the head (400).

Moreover, the present application relates to a hollow endodontic instrument (10) for shaping and simultaneous flushing and suction a tooth root canal comprising:

a) an inner spicular passage (200) for delivering an irrigation solution, b) a hollow elongated mesh-like structure (100) for shaping a tooth root canal containing an active part and a coronal part, surrounding the inner spicular passage, and the active part protruding over the length of the inner spicular passage (200) and the active part comprises longitudinal elements (110) and circumferential elements (120) that connect adjacent longitudinal elements (110) and the active part of the hollow elongated mesh-like structure (100) is self-adjustable to the anatomy of the tooth root canal, and c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The present application refers also to a head (400) comprising the hollow endodontic instrument (10) and a dental device (600) comprising the head (400).

Furthermore, the present application relates to a hollow endodontic instrument (10) for shaping and simultaneous flushing and suction a tooth root canal comprising:

a) an inner spicular passage (200) for delivering an irrigation solution, b) a hollow elongated mesh-like structure (100) for shaping a tooth root canal containing an active part and a coronal part, surrounding the inner spicular passage, and the active part protruding over the length of the inner spicular passage (200) and the active part comprises longitudinal elements (110) and circumferential elements (120) that connect adjacent longitudinal elements (110) and at least two of the longitudinal elements (110) converge in one cusp (140) and the active part of the hollow elongated mesh-like structure (100) is self-adjustable to the anatomy of the tooth root canal, and c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The present application refers also to a head (400) comprising the hollow endodontic instrument (10) and a dental device (600) comprising the head (400).

The active part of the hollow elongated mesh-like structure (100) can contain an inclination (180) at the apical part of the active part of the hollow elongated mesh-like structure (100).

The apical part of the active part of the hollow elongated mesh-like structure (100) is the part of the endodontic instrument (10) which is closest to the apical part of the tooth root canal. Thus, the terminal part of the active part for cleaning the apex region is referred to as apical part.

The outer surface of the hollow elongated mesh-like structure (100) preferably the active part of the hollow elongated mesh-like structure (100) can constructed or modified in such a way as to allow the instrument to remove material from the wall of the canal when relative motion takes place between it and the wall. For example, at least part of the outer surface of the hollow elongated mesh-like structure (100) preferably the active part of the hollow elongated mesh-like structure (100) can be coated with a coating of an abrasive material, which can be for example, diamond powder, titanium nitride, or tungsten carbide. The outer surface of the hollow elongated mesh-like structure (100) the active part of the hollow elongated mesh-like structure (100) can be roughened, or can comprise numerous small teeth, or comprises a cutting edge.

In order to increase the ability of the endodontic instrument to adapt itself to the root canal so that an enlargement of the root canal can be further restricted and the ablation of healthy dentin weakening the tooth structure can be further reduced, the endodontic instrument can be configured in such a way that it compresses itself up to 7.5 times, preferably from 1 to 7.5 times, more preferably from 2 to 7.5 times, still more preferably from 3 to 7.5 times, still more preferably from 4 to 7.5 times, still more preferably 5 to 7.5 times, still more preferably 6 to 7.5 times, still more preferably 6.5 to 7.5 times, still more preferably 7 to 7.5 times, and most preferably 7.5 times. For example, the endodontic file may compress itself from 1.5 mm to 0.2 mm or from 2.0 to 0.3 mm.

Furthermore, the adaption of the endodontic instrument to the root canal can be ensured if the ratio between the diameter preferably the outer diameter of the spicular passage (200) for delivering an irrigation solution and the diameter preferably the inner diameter of the mesh-like structure for shaping a tooth root canal is from 0.1 to 0.8, preferably from 0.1 to 0.7, more preferably form 0.1 to 0.6, more preferably from 0.1 to 0.5, more preferably form 0.1 to 0.45, more preferably from 0.1 to 0.4, more preferably from 0.1 to 0.35, more preferably from 0.1 to 0.3, and most preferably from 0.1 to 0.2.

The ratio between the length of the inner spicular passage (200) for delivering an irrigation solution and a tooth root canal and the length of the hollow elongated mesh-like structure (100) for cleaning and/or shaping and/or widening a tooth root canal can be from 0.6 to 1.

An embodiment according to the invention is directed to a hollow endodontic instrument (10) as described herein, wherein ratio between the diameter preferably the outer diameter of the first inner spicular passage (200) for delivering an irrigation solution to a tooth root canal and the diameter preferably the inner diameter of the hollow elongated mesh-like structure (100) is from 0.1 to 0.7, and/or the ratio between the length of the inner spicular passage (200) for delivering an irrigation solution and a tooth root canal to the length of the hollow elongated mesh-like structure (100) for cleaning and/or shaping and/or widening a tooth root canal is from 0.6 to 1.

Thus, an embodiment according to the present invention is related to a hollow endodontic instrument (10) for shaping and simultaneous flushing and suction a tooth root canal comprising:
a) an inner spicular passage (200) for delivering an irrigation solution,
b) a hollow elongated mesh-like structure (100) for shaping a tooth root canal containing an active part and a coronal part, surrounding the inner spicular passage, and the active part protruding over the length of the inner spicular passage (200), and
c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100), and wherein ratio between the outer diameter of the first inner spicular passage (200) for delivering an irrigation solution to a tooth root canal and the inner diameter of the hollow elongated mesh-like structure (100) is from 0.1 to 0.7, and/or the ratio between the length of the inner spicular passage (200) for delivering an irrigation solution and a tooth root canal to the length of the hollow elongated mesh-like structure (100) for cleaning and/or shaping and/or widening a tooth root canal is from 0.6 to 1.

The ratio between the length of the inner spicular passage (200) and the length of the coronal part of the hollow elongated mesh-like structure (100) can be from 1.05 to 10, preferably from 1.1 to 9.5, more preferably from 1.2 to 9, more preferably from more preferably from 1.3 to 8.5, more preferably from 1.4 to 8, more preferably from 1.5 to 7.5, more preferably from 2 to 7, more preferably from 2.5 to 6.5, and most preferably 3 to 6.2.

The distance between the tip of the hollow elongated mesh-like structure (100) and the tip of the inner spicular passage (200) can be from 0.01 to 15 mm, preferably 0.05 to 14.5 mm, more preferably from 0.1 to 14 mm, more preferably from 0.2 to 13.5 mm, more preferably from 0.3 to 13 mm, more preferably from 0.4 to 12.5 mm, more preferably from 0.5 to 12 mm, more preferably from 0.6 to 11.5 mm, more preferably from 0.7 to 11 mm, more preferably from 0.8 to 10.5 mm, more preferably from 0.9 to 10 mm, more preferably from 1 to 9.5 mm, more preferably from 1.1 to 9 mm, more preferably from 1.2 to 8.5 mm, more preferably from 1.3 to 8 mm, more preferably from 1.4 to 7.5 mm, more preferably from 1.5 to 7 mm, more preferably from 2 to 6.5 mm, more preferably from 2.5 to 6 mm, more preferably from 2.5 to 5.5 mm, more preferably from 3 to 5.5 mm, more preferably from 3.5 to 5.5 mm, more preferably from 4 to 5.5 mm, and most preferably from 4.5 to 5.5 mm.

The "tip of the hollow elongated mesh-like structure" is the point of the hollow elongated mesh-like structure (100) being closest to the apex of the tooth when inserted into the tooth root canal and preferably the narrowest part of hollow elongated mesh-like structure (100).

The hollow elongated mesh-like structure (100) and the inner spicular passage (200) can be connected monolithically, i.e. merely the connection is monolithic. It is also possible that the hollow elongated mesh-like structure (100) and the inner spicular passage are monolithic, i.e. they are monolithically prepared. Another possibility being preferred is that the hollow elongated mesh-like structure and the inner spicular passage are not monolithically connected, i.e. the connection between said elements is not monolithic. For this, preferably the hollow elongated mesh-like structure contains (100) a protrusion (150) in its coronal part, and the inner spicular passage (200) contains a notch (160). Said notch (160) and the protrusion (150) function as a tongue-and-notch connection. An embodiment of the endodontic instrument (10) containing a protrusion (150) in the coronal part of the hollow elongated mesh-like structure (100) as well as a notch (160) in the inner spicular passage (200) is shown in FIGS. 4A, 4B, and 4C. Thus, an embodiment according to the invention is directed to an endodontic instrument (10) as described herein, wherein the coronal part of the hollow elongated mesh-like structure (100) contains a protrusion (150) directing to the interior space of the hollow elongated mesh-like structure (100), and the inner spicular passage (200) contains a notch (160).

Therefore, an embodiment according to invention is related to a hollow endodontic instrument (10) for shaping and simultaneous flushing and suction a tooth root canal comprising:
a) an inner spicular passage (200) for delivering an irrigation solution, wherein the inner spicular passage (200) contains a notch (160),
b) a hollow elongated mesh-like structure (100) for shaping a tooth root canal containing an active part and a coronal part, surrounding the inner spicular passage, and the active part protruding over the length of the inner spicular passage (200), wherein the coronal part of the hollow elongated mesh-like structure (100) contains a protrusion (150) directing to the interior space of the hollow elongated mesh-like structure (100), and
c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

The protrusion (150) can have the form of a wedge. Preferably, the protrusion (150) is v-shaped.

The notch (160) can be a hole through the whole wall of the coronal part of the hollow elongated mesh-like structure (100) or preferably a whole which is not a passage, i.e. it is not a hole through the whole wall of the coronal part of the hollow elongated mesh-like structure (100). Preferably, the notch is wedge-shaped.

The suction element (300) forming at least one outer passage for sucking the irrigation solution can be an opening, hole, and/or pores. If the suction element (300) forming at least one outer passage for sucking the irrigation solution is located in the coronal part of the hollow elongated mesh-like structure (100), wherein the suction element (300) comprises openings hole and/or pores, the suction element can be inserted into the coronal part of the tooth so that the protection of the overflow of irrigation solution can be further improved. Thus, an embodiment according to the invention is directed to a hollow endodontic instrument (10) as described herein, wherein the suction element (300) comprises opening, hole, and/or pores.

Therefore, an embodiment according to the present invention is related to a hollow endodontic instrument (10) for shaping and simultaneous flushing and suction a tooth root canal comprising:
- a) an inner spicular passage (200) for delivering an irrigation solution,
- b) a hollow elongated mesh-like structure (100) for shaping a tooth root canal containing an active part and a coronal part, surrounding the inner spicular passage, and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the suction element (300) comprise openings, holes, and/or pores, wherein the inner spicular passage (200) is insertable into the tooth root canal, and wherein the suction element (300) is located in the coronal part of the hollow elongated mesh-like structure (100).

Moreover, preferably the suction element (300) can be at least partially positioned around at least a portion of the hollow elongated mesh-like structure (100). Thus, an embodiment according to the invention is directed to a hollow endodontic instrument (10) as described herein, wherein the suction element (300) is at least partially positioned around at least a portion of the hollow elongated mesh-like structure (100).

Therefore, an embodiment according to the present invention is related to a hollow endodontic instrument (10) for shaping and simultaneous flushing and suction a tooth root canal comprising:
- a) an inner spicular passage (200) for delivering an irrigation solution,
- b) a hollow elongated mesh-like structure (100) for shaping a tooth root canal containing an active part and a coronal part, surrounding the inner spicular passage, and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100).

It is also possible that the suction element (300) surrounds at least a portion of the hollow elongated mesh-like structure (100) with and is located in the coronal part of the hollow elongated mesh-like structure (100) and preferably comprises openings, holes, and/or pores in order to insert the suction element into the coronal part of the tooth so that the overflow of the irrigation solution can be further improved and in order to suck the irrigation solution when the suction element does not contact the surface of the tooth or is not close to the surface of the tooth.

Therefore, an embodiment according to the present invention is related to a hollow endodontic instrument (10) for shaping and simultaneous flushing and suction a tooth root canal comprising:
- a) an inner spicular passage (200) for delivering an irrigation solution,
- b) a hollow elongated mesh-like structure (100) for shaping a tooth root canal containing an active part and a coronal part, surrounding the inner spicular passage, and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) surrounds at least a portion of the hollow elongated mesh-like structure (100) and is located in the coronal part of the hollow elongated mesh-like structure (100), wherein the suction element (300) comprises openings, holes, and/or pores.

The suction element (300) can be at least partially positioned around at least a portion of the coronal part of the hollow elongated mesh-like structure (100). Thus, an embodiment according to the invention is directed to a hollow endodontic instrument (10) as described herein, wherein the suction element (300) is at least partially positioned around at least a portion of the coronal part of the hollow elongated mesh-like structure (100).

Therefore, an embodiment according to the present invention is related to a hollow endodontic instrument (10) for shaping and simultaneous flushing and suction a tooth root canal comprising:
- a) an inner spicular passage (200) for delivering an irrigation solution,
- b) a hollow elongated mesh-like structure (100) for shaping a tooth root canal containing an active part and a coronal part, surrounding the inner spicular passage, and the active part protruding over the length of the inner spicular passage (200), and
- c) a suction element (300) forming at least one outer passage for sucking the irrigation solution surrounding the inner spicular passage (200) preferably in a tube-in-tube arrangement, wherein the inner spicular passage (200) is insertable into the tooth root canal, and wherein the suction element (300) is at least partially positioned around at least a portion of the coronal part of the hollow elongated mesh-like structure (100).

If the irrigation solution fills the tooth till the upper part of the coronal part, said solution can overflow. Normally, the pump used for the suction of the irrigation is able to perform a suction being strong enough to ensure that the irrigation solution does not overflow. But the risk of overflow can further be reduced if the suction element rest on top of the tooth or a few millimetres above the tooth during the root canal treatment.

The suction element (300) can be made of a material selected from the group comprising or consisting of a polymer, a metal and/or a metal alloy. Thus, an embodiment according to the invention is directed to an endodontic instrument (10) as described herein, wherein the suction element (300) is made of a polymer, a metal and/or a metal alloy.

Therefore, an embodiment according to the present invention is related to a hollow endodontic instrument (10) for shaping and simultaneous flushing and suction a tooth root canal comprising:
- a) an inner spicular passage (200) for delivering an irrigation solution,
- b) a hollow elongated mesh-like structure (100) for shaping a tooth root canal containing an active part and a coronal part, surrounding the inner spicular passage, and the active part protruding over the length of the inner spicular passage (200), and c) a suction element (300) forming at least one outer passage for sucking the irrigation solution surrounding the inner spicular passage (200) preferably in a tube-in-tube arrangement, wherein the suction element (300) is made of material selected from the group consisting of a polymer, a metal and/or metal alloy, wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100).

Moreover, the hollow elongated mesh-like structure of the endodontic instrument (10) having a inner spicular passage has to be provided and/or configured in such a way that the irrigation solution can be sucked from the canal while the tooth root canal is shaped by a single device in order to reduce the treatment time, to reduce the risk of an accident with a harmful irrigation solution in particular sodium hypochlorite, to increase the practicability, to reduce personnel effort during treatment, and/or to reduce the required space in the tooth for the root canal treatment, i.e. to reduce the loss of dental substance.

Therefore, another aspect of the invention is related to a hollow endodontic instrument (10) for shaping and simultaneous flushing and suction a tooth root canal comprising:
a) an inner spicular passage (200) for delivering an irrigation solution, and
b) a hollow elongated mesh-like structure (100) for shaping a tooth root canal containing an active part and a coronal part, surrounding the inner spicular passage, and the active part protruding over the length of the inner spicular passage (200).

Moreover, the hollow elongated mesh-like structure of the endodontic instrument (10) according to the state of the art has to be configured in such a way that it can be attached to the inner spicular passage so that the irrigation solution can be sucked from the canal while the tooth root canal is shaped by a single device in order to reduce the treatment time, to reduce the risk of an accident with a harmful irrigation solution in particular sodium hypochlorite, to increase the practicability, to reduce personnel effort during treatment, and/or to reduce the required space in the tooth for the root canal treatment, i.e. to reduce the loss of dental substance.

Thus, a further aspect of the present invention is directed to a hollow elongated mesh-like structure (100) for shaping a tooth root canal containing an active part and a coronal part, wherein the coronal part of the hollow elongated mesh-like structure (100) comprises at least one notch.

| Reference List | |
|---|---|
| 10 | hollow endodontic instrument |
| 100 | hollow elongated mesh-like structure |
| 101 | longitudinal axis of the hollow elongated metal-like structure |
| 110 | longitudinal elements |
| 120 | circumferential elements |
| 130 | node |
| 140 | cusp of the hollow elongated mesh-like structure |
| 150 | protrusion |
| 160 | notch |
| 170 | hollow shaft |
| 180 | inclination |
| 200 | inner spicular passage |
| 201 | longitudinal axis of the inner spicular passage |
| 210 | apical part |
| 220 | coronal part |
| 230 | holder part |
| 300 | suction element |
| 400 | head |

-continued

| Reference List | |
|---|---|
| 410 | tool holder |
| 420 | housing |
| 430 | port for delivering an irrigation solution to a tooth root canal |
| 440 | port for sucking an irrigation solution from a tooth root canal |
| 450 | drive arrangement |
| 500 | motorized power handle |
| 600 | dental device |
| 700 | distance measurer |

Figure 1:
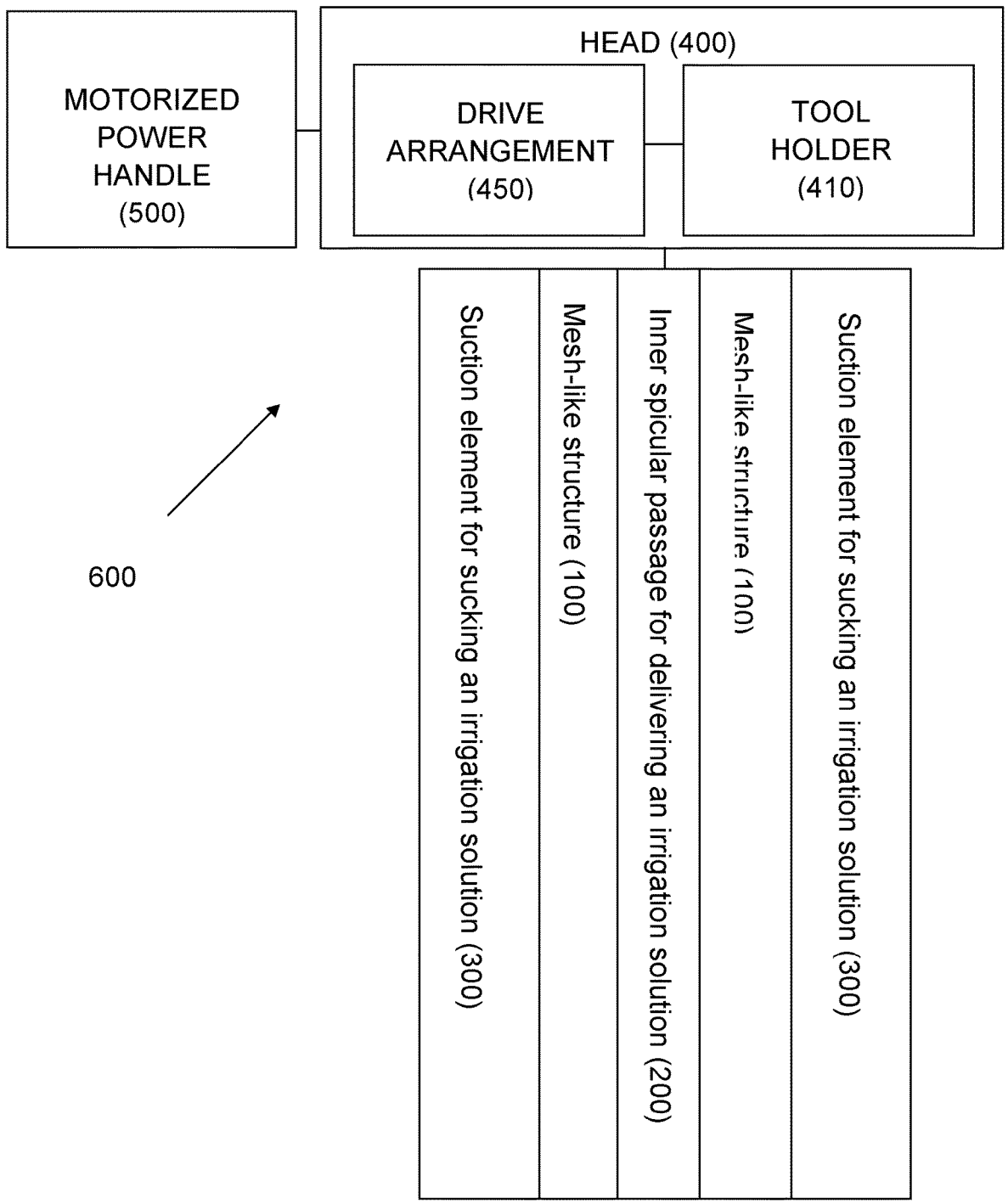
FIG. 1 shows a schematic representation of an embodiment of a dental device (600) according to the invention.
Figure 2:
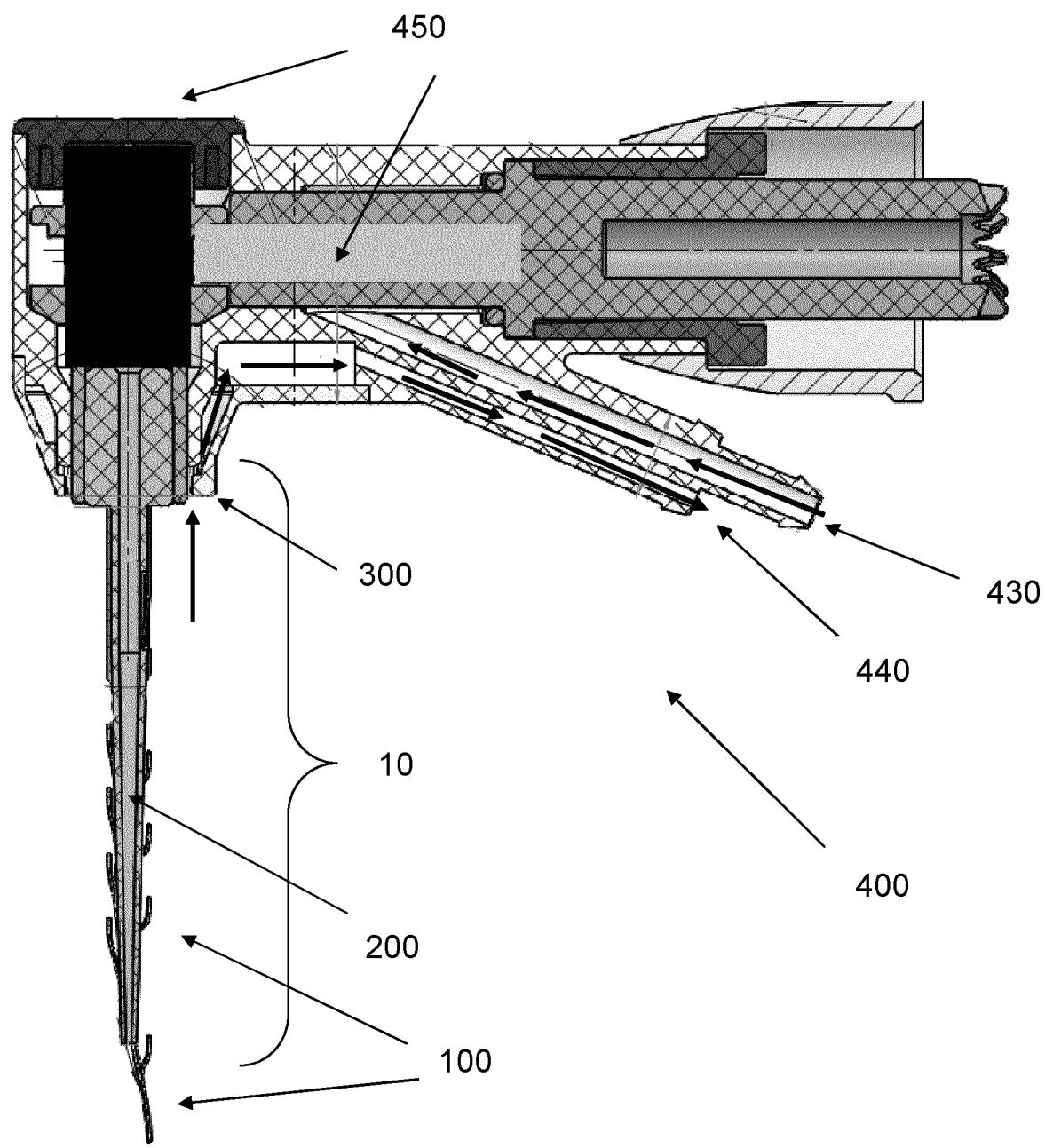
FIG. 2 shows a longitudinal sectional view of an embodiment of a head (400) of a dental device (600) for shaping and simultaneous flushing and suction of a tooth root canal by shaping the tooth root canal with a hollow elongated mesh-like structure (100) while flushing the tooth root canal with an irrigation solution according to the invention. The flow of irrigation solution is visible.
Figure 3:
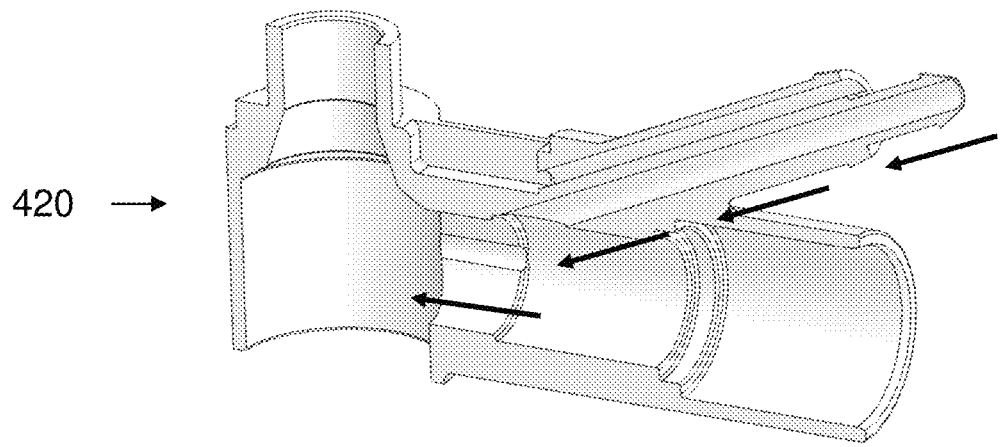
FIG. 3 shows the housing (420) of the head (400) according to FIG. 2. The delivering of the irrigation solution of the head (400) is shown. In this embodiment, the delivered irrigation solution flows among other along the wall of the housing (420) of the head.
Figure 4A:
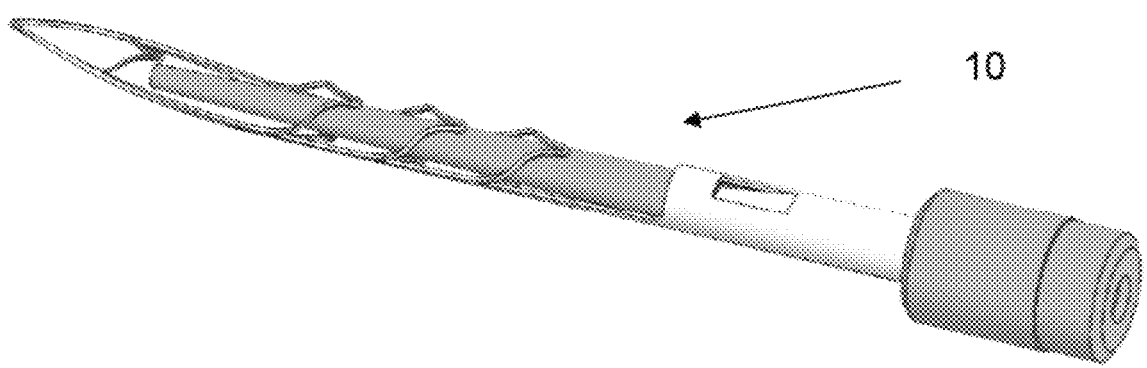
FIG. 4A shows an embodiment of an endodontic instrument (10) according to the invention from which it is evident that the hollow elongated mesh-like structure (100) protrudes over the length of the inner spicular passage (200), 4B shows an embodiment of the inner spicular passage (200) without the hollow elongated mesh-like structure (100), and 4C shows two different views of the hollow elongated mesh-like structure (100) without the inner spicular passage (200).
Figure 4B:
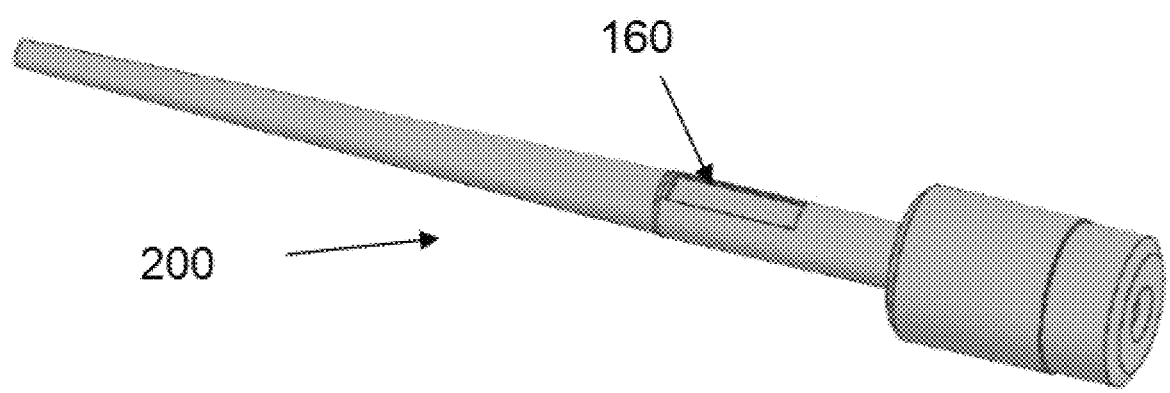
Figure 4C:
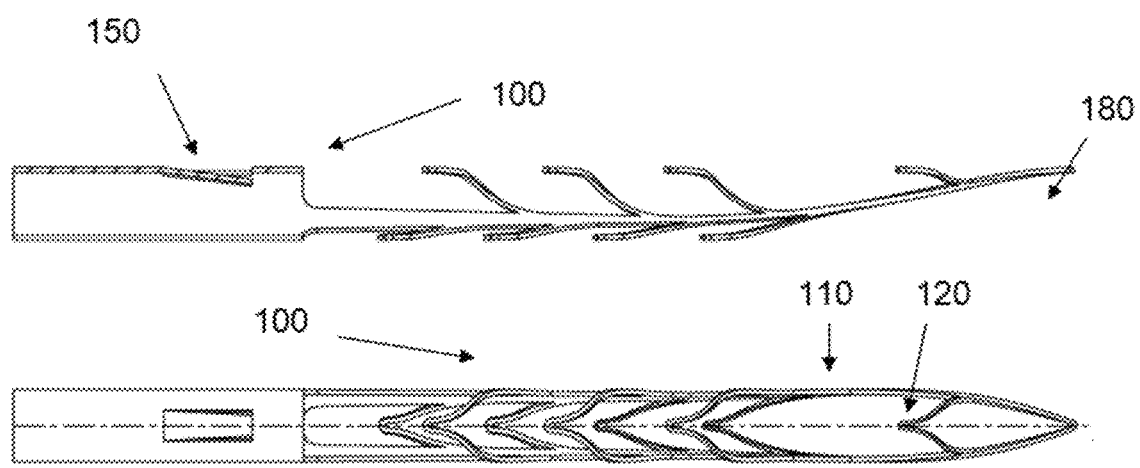
Figure 5:
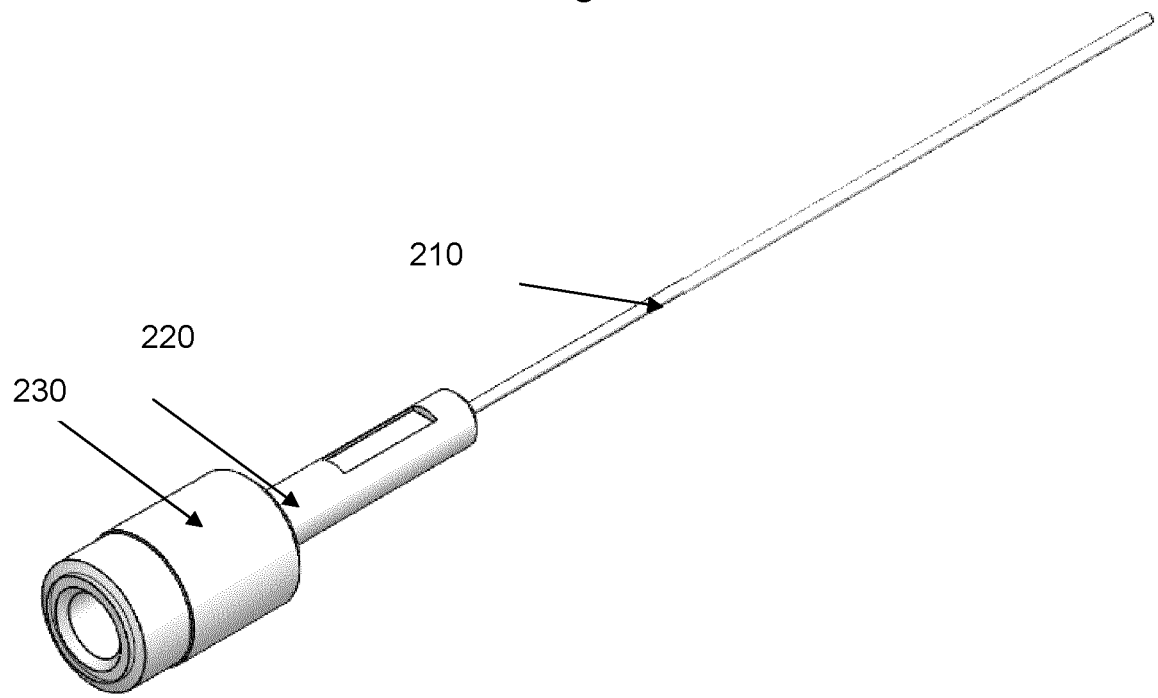
FIG. 5 shows an embodiment of the inner spicular passage (200) according to the invention. Said inner spicular passage (200) is cylindrical.
Figure 6:
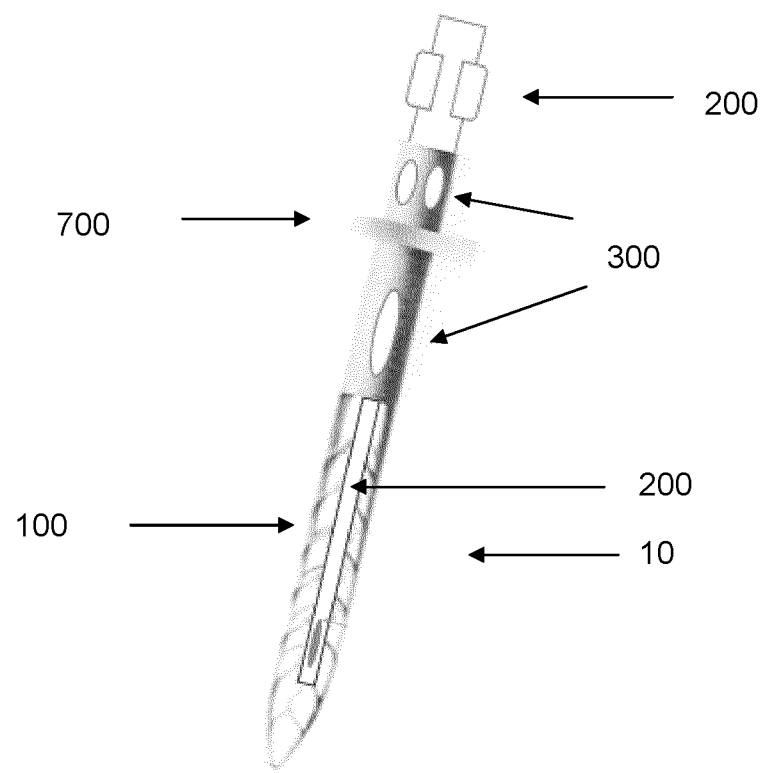
FIG. 6 shows an embodiment of an endodontic instrument (10) according to the invention, wherein the suction element (300) is located in the coronal part of the hollow mesh-like structure (10). It is evident that the hollow elongated mesh-like structure (100) surrounds the inner spicular passage (200) and also extends over the end of the inner spicular passage (200). Moreover the tube-in-tube arrangement of the inner spicular passage (200) as inner tube surrounded by the suction element (300) as outer tube is evident. This embodiment contains also a distance measurer (700) which is not limited to this embodiment. But this embodiment without the distance measurer (700) shall also be regarded as an embodiment according to the invention being disclosed.
Figure 7:
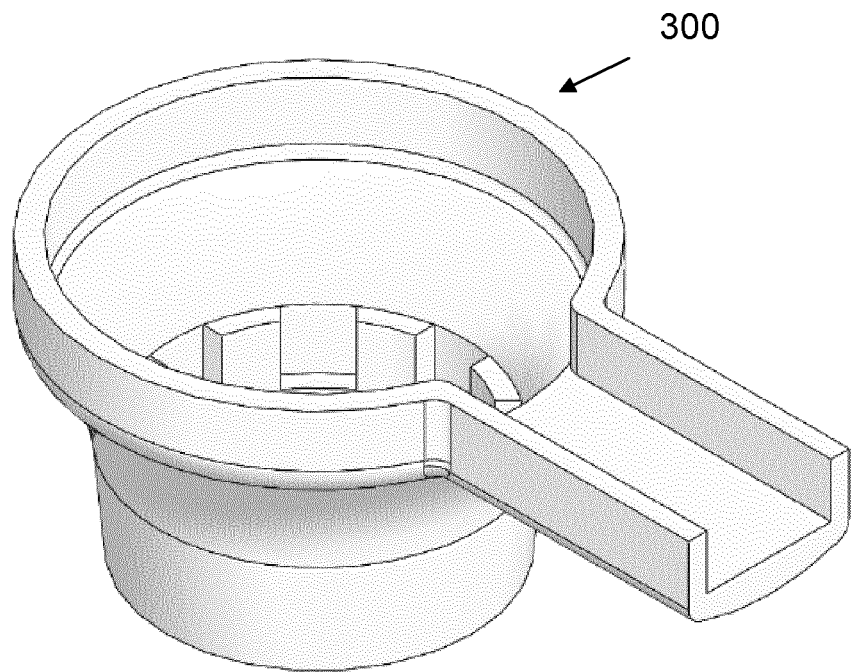
FIG. 7 shows an embodiment of the suction element (300) according to the invention which has the form of a tube with an outlet for removing the irrigation solution together with the debris and pulpal material.
Figure 8:
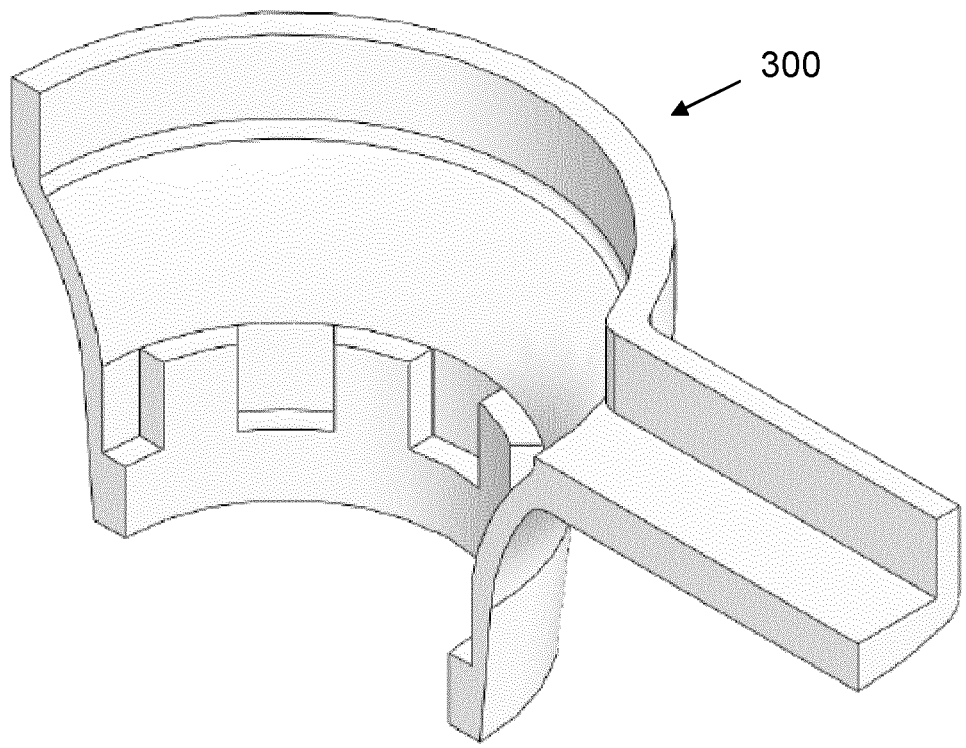
FIG. 8 shows a longitudinal sectional view of the suction element (300) according to FIG. 6.
Figure 9A:
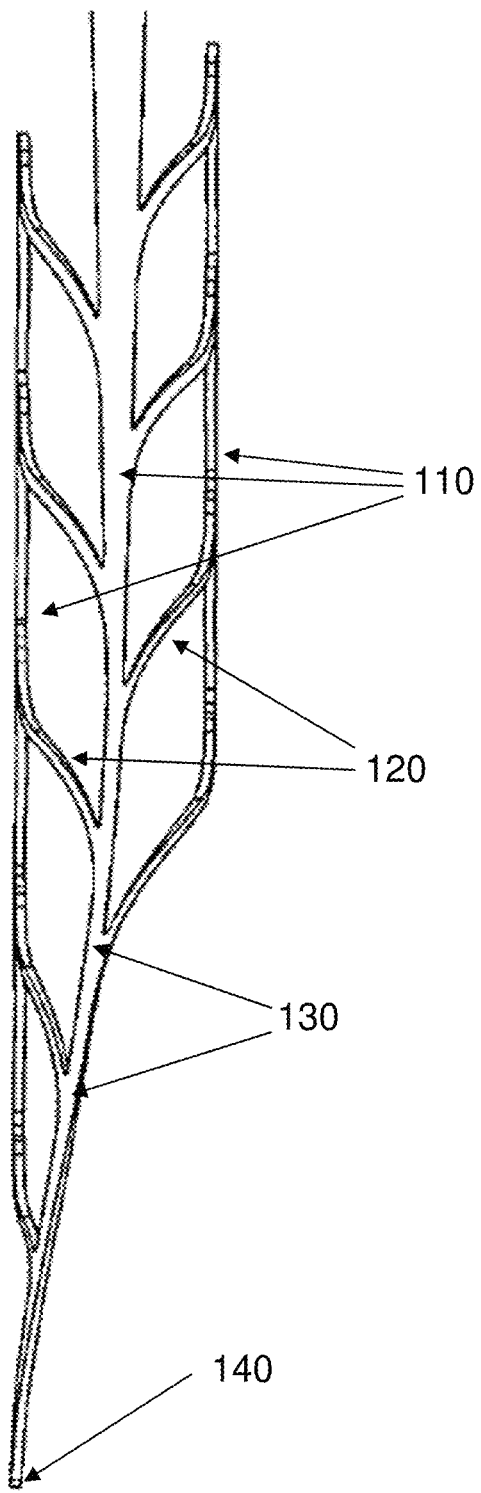
FIGS. 9A and 9B show views of two embodiments of the hollow elongated mesh-like structure (100) with the longitudinal elements (110), the circumferential elements (120), the nodes (130) and the cusps (140).
Figure 9B:
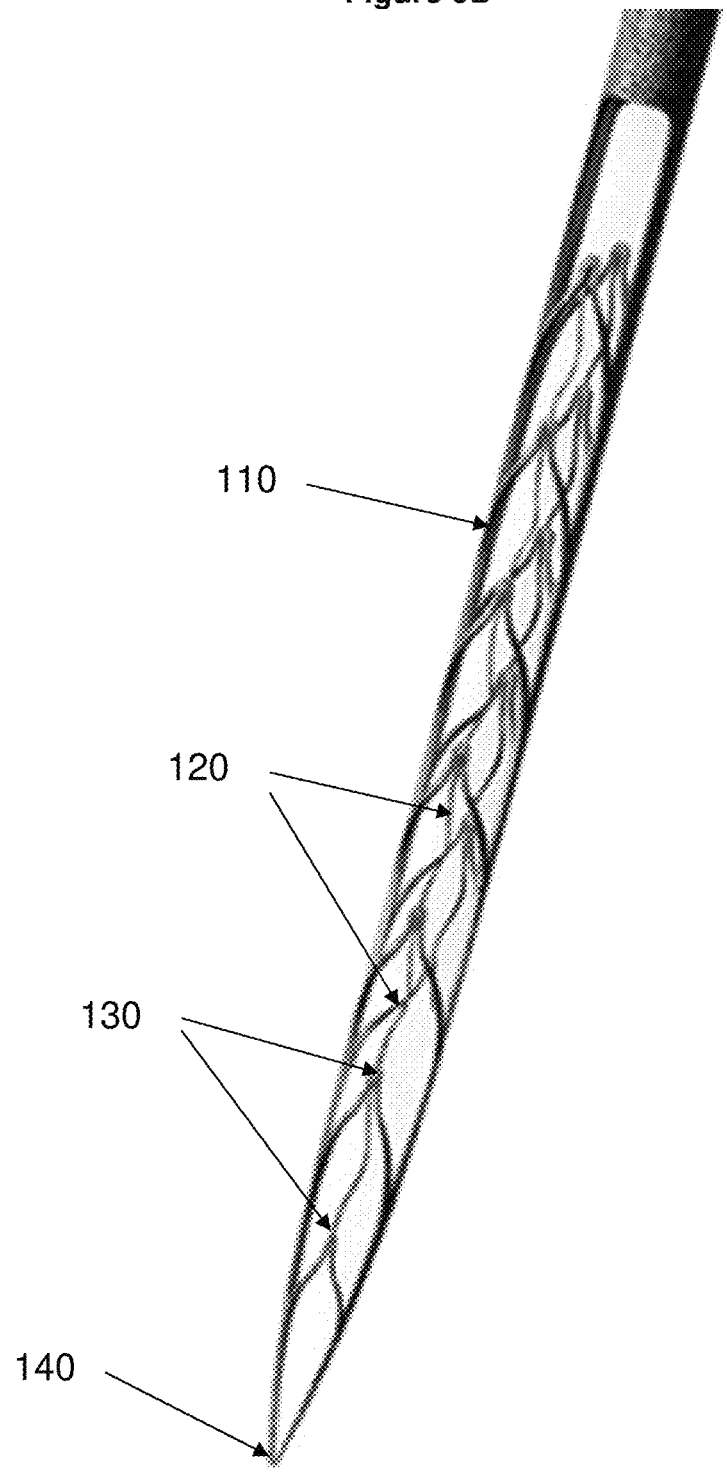
Figure 10:
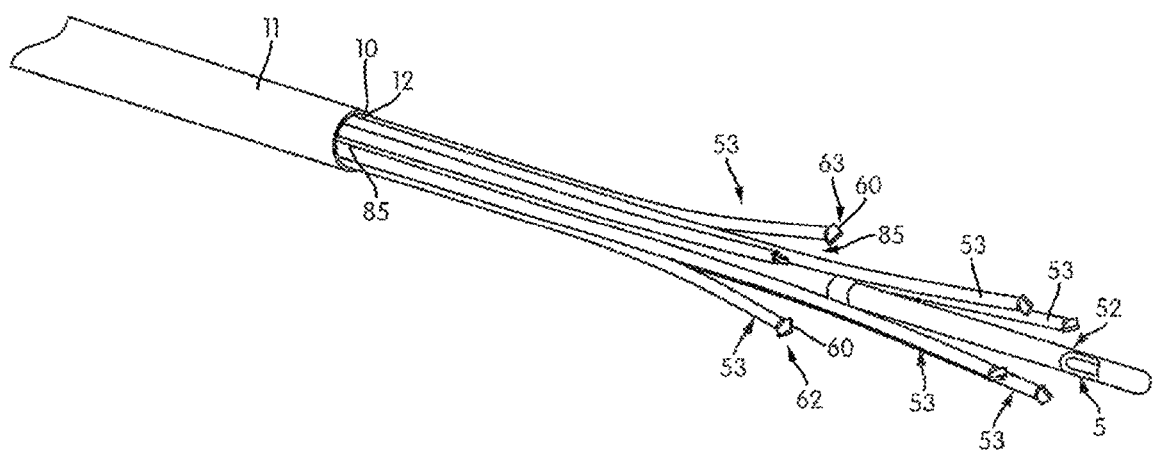
FIG. 10: shows a state of the art embodiment of US 2014/0302454 A1.

The invention claimed is:

1. A hollow endodontic instrument (10) for shaping and simultaneous flushing and suctioning a tooth root canal comprising:
   a) an inner spicular passage (200) for delivering an irrigation solution,
   b) a hollow elongated mesh-like structure (100) for shaping a tooth root canal containing an active part and a coronal part, surrounding the inner spicular passage (200), and the active part protruding over the length of the inner spicular passage (200), and
   c) a suction element (300) forming at least one outer passage for sucking the irrigation solution surrounding the inner spicular passage (200),
   wherein the inner spicular passage (200) is insertable into the tooth root canal, and wherein the suction element (300) surrounds at least a portion of the hollow elongated mesh-like structure (100) and/or is located in the coronal part of the hollow elongated mesh-like structure (100), and
   wherein the active part of the hollow elongated mesh-like structure (100) for shaping a tooth root canal comprises longitudinal elements (110) and circumferential elements (120) that connect adjacent longitudinal elements (110).

2. The hollow endodontic instrument (10) according to claim 1, wherein the hollow elongated mesh-like structure (100) for shaping a tooth root canal has a length from 21 to 31 mm, and a diameter from 0.9 mm to 2 mm.

3. The hollow endodontic instrument (10) according to claim 1, wherein the inner spicular passage (200) for delivering an irrigation solution to a tooth root canal has a diameter from 0.2 to 0.6 mm and a length from 21 to 31 mm.

4. The hollow endodontic instrument (10) according to claim 1, wherein ratio between the outer diameter of the inner spicular passage (200) for delivering an irrigation solution to a tooth root canal and the diameter of the hollow elongated mesh-like structure (100) is from 0.1 to 0.7, and/or the ratio between the length of the inner spicular passage (200) for delivering an irrigation solution to a root canal and the length of the hollow elongated mesh-like structure (100) for cleaning and/or shaping and/or widening a tooth root canal is from 0.6 to 1.

5. The hollow endodontic instrument (10) according to claim 1, wherein at least two of the longitudinal elements (110) converge in one cusp (140).

6. The hollow endodontic instrument (10) according to claim 1, wherein the coronal part of the hollow elongated mesh-like structure (100) for shaping a tooth root canal comprises a hollow shaft (170).

7. The hollow endodontic instrument (10) according to claim 1, wherein the suction element (300) is at least partially positioned around the coronal part of the hollow elongated mesh-like structure.

8. The hollow endodontic instrument (10) according to claim 1, wherein the hollow elongated mesh-like structure (100) is made of a metal.

9. The hollow endodontic instrument according to claim 8, wherein the hollow elongated mesh-like structure (100) is made of metal with shape memory.

10. The hollow endodontic instrument (10) according to claim 1, wherein the hollow elongated mesh-like structure (100) is made of a nickel-titanium alloy.

11. The hollow endodontic instrument (10) according to claim 1, wherein the active part of the hollow elongated mesh-like structure (100) or the apical part of the active part of the hollow elongated mesh-like structure (100) is self-adjustable to the anatomy of the tooth root canal.

12. The hollow endodontic instrument according to claim 1, wherein the inner spicular passage is a tube in tube arrangement.

13. A head (400) of a dental device (600) for shaping and simultaneous flushing and suctioning of a tooth root canal by shaping the tooth root canal with the hollow endodontic instrument (10) for insertion into the tooth root canal according to claim 1.

14. The head (400) according to claim 13, wherein the head (400) contains a port for delivering an irrigation solution to a tooth root canal (430) and a port for sucking an irrigation solution from a tooth root canal (440).

15. The head (400) according to claim 14, wherein the port for sucking an irrigation solution (440) from a tooth root canal is positioned at least partially around the port for delivering an irrigation solution to a tooth root canal (430).

16. A dental device (600) for shaping and simultaneous flushing and suctioning a tooth root canal comprising the head (100) according to claim 14 and a motorized power handle (500).

* * * * *